United States Patent
Komatsu et al.

(10) Patent No.: US 10,759,665 B2
(45) Date of Patent: Sep. 1, 2020

(54) SILICA PARTICLE DISPERSION AND METHOD FOR PRODUCING THE SAME

(71) Applicant: JGC CATALYSTS AND CHEMICALS LTD., Kanagawa (JP)

(72) Inventors: Michio Komatsu, Fukuoka (JP); Hiroyasu Nishida, Fukuoka (JP)

(73) Assignee: JGC Catalysts and Chemicals Ltd., Kawasaki (JP)

( * ) Notice: Subject to any disclaimer, the term of this patent is extended or adjusted under 35 U.S.C. 154(b) by 0 days.

(21) Appl. No.: 16/474,614

(22) PCT Filed: Dec. 26, 2017

(86) PCT No.: PCT/JP2017/046752
§ 371 (c)(1),
(2) Date: Jun. 28, 2019

(87) PCT Pub. No.: WO2018/124117
PCT Pub. Date: Jul. 5, 2018

(65) Prior Publication Data
US 2019/0345036 A1 Nov. 14, 2019

(30) Foreign Application Priority Data
Dec. 28, 2016 (JP) ................. 2016-256458

(51) Int. Cl.
C01B 33/141 (2006.01)
B01F 3/04 (2006.01)

(52) U.S. Cl.
CPC ...... *C01B 33/1417* (2013.01); *B01F 3/04106* (2013.01); *C01P 2004/64* (2013.01)

(58) Field of Classification Search
CPC ..... C01B 33/14–145; C01B 33/18–193; B01F 3/04106–04269; B01F 2003/04127–04432
See application file for complete search history.

(56) References Cited

U.S. PATENT DOCUMENTS 4,624,800 A 11/1986 Sasaki et al.

FOREIGN PATENT DOCUMENTS

| JP | 60-127216 A | 7/1985 |
| JP | 2007-075660 A | 3/2007 |
| JP | 2011-41869 A | 3/2011 |
| JP | 2014-198649 A | 10/2014 |
| JP | 2019-116396 A | 7/2019 |
| KR | 20130024864 A * | 3/2013 |

OTHER PUBLICATIONS

Machine Translation of KR20130024864A. Mar. 8, 2013. (Year: 2013).*
International Search Report issued in in corresponding International Patent Application No. PCT/JP2017/046752 dated Apr. 3, 2018
Japanese Office Action issued in corresponding Japanese Patent Application No. 2016-256458 dated Sep. 27, 2017.
Decision to Grant issued in corresponding Japanese Patent Application No. 2016-256458 dated Nov. 2, 2017.

* cited by examiner

*Primary Examiner* — Stephen E Rieth
(74) *Attorney, Agent, or Firm* — Troutman Pepper Hamilton Sanders LLP

(57) ABSTRACT

Provided is a dispersion containing high-purity silica particles and a method for producing the same. A first solution containing a silane alkoxide and a second solution containing fine bubbles having an average bubble diameter of 40 nm to 10 μm are mixed. Thus, the silane alkoxide is hydrolyzed without using an alkaline catalyst in a liquid phase containing the fine bubbles, so that uniform silica particles having an average particle size of 3 to 10 nm are produced. Further, hydrolysis is carried out by adding a hydrolyzable metal compound to the dispersion containing the silica particles in the presence of the fine bubbles and the alkaline catalyst. Thus, the silica particles are grown, so that a uniform silica-based particle dispersion containing particles having an average particle size of more than 10 nm and 300 nm or less is produced.

12 Claims, 1 Drawing Sheet

SILICA PARTICLE DISPERSION AND METHOD FOR PRODUCING THE SAME

CROSS REFERENCE TO RELATED APPLICATIONS

This is a U.S. National Phase Application under 35 U.S.C. § 371 of International Patent Application No. PCT/JP2017/046752, filed Dec. 26, 2017, which claims priority of Japanese Patent Application No. 2016-256458, filed Dec. 28, 2016. The entire contents of which are hereby incorporated by reference.

TECHNICAL FIELD

The present invention relates to a silica particle dispersion produced using fine bubbles (micro-nano bubbles) having an average bubble diameter of 40 nm to 10 μm. Specifically, the present invention relates to a dispersion containing high-purity silica fine particles having an average particle size of 3 to 10 nm. The present invention also relates to a silica-based particle dispersion using the high-purity silica fine particles.

BACKGROUND

For example, high-purity silica sol is used in fields of a polishing agent for silicon wafer, a raw material such as high-purity silica gel for liquid chromatography carrier, a binder for catalyst, a raw material of special zeolite, a microfiller added to paints for electronic materials, a microfiller for polymer films, and the like.

Such high-purity silica sol is generally produced by mixing silane alkoxide such as tetramethoxysilane (TMOS), tetraethoxysilane (TEOS) or the like with water and an alkaline catalyst such as ammonia or an amine compound and subjecting it to hydrolysis and condensation polymerization (for example, see Patent Literature 1).

On the other hand, silica sol (small particle size silica sol) containing silica particles of small particle size is particularly used for final polishing of a 300 mm wafer. The silica sol can improve flatness without scratches, and further, it can be expected to have an effect of removing deposits to a substrate. Further, the small particle size silica sol can be used as the polishing agent in chemical mechanical polishing during production of a large-scale integrated circuit which is being significantly miniaturized. Furthermore, by adding the small particle size silica sol to an optical film and a molded product, it is also possible to develop high hardness and obtain a film with low haze.

SUMMARY

As described above, in production of the high-purity silica sol, ammonia or the amine compound is used alone or in combination as a hydrolysis catalyst. Further, they are generally used for the purpose of pH adjustment. From this, when the produced fine silica sol is used in a high precision semiconductor wafer in recent years, there is a concern that the amine compound or the like is captured at wafer interconnects, and a resist is contaminated, resulting in production defects. That is, a nitrogen-containing compound contaminates the wafer and a production line, and there is a possibility that this may lead to defect generation, a decrease in electrical properties such as anomalous leak current of circuits or elements formed on the wafer, or a reduction in yield.

Further, in the above-mentioned conventional production method, reaction rate of hydrolyzate is adjusted in order to obtain fine particles. Thus, as non-hydrolyzate remains, microgel is generated by a reaction between the produced particles and the non-hydrolyzate. Therefore, it has been difficult to obtain monodispersed particles of 10 nm or less. In addition, there has been a problem that it is difficult to prepare reproducible one. Specifically, in order to obtain the fine particles under the alkaline catalyst, it is important to generate fine seeds (seed particles) during hydrolysis. However, no such seed has been obtained. For example, according to a method of JP-A-2014-198649, the fine seeds cannot be obtained because a large amount of alkali is required. As a result, the particles grow to a size greater than 10 nm.

The present invention has been made in view of such circumstances. An object of the present invention is to provide a dispersion containing high-purity silica particles substantially free of the nitrogen-containing compound and a method for producing the same. Another object of the present invention is to provide the dispersion containing high-purity silica fine particles having a small particle size, such as 3 to 10 nm in average particle size, and the method for producing the same. Still another object of the present invention is to provide a silica-based particle dispersion using the high-purity silica fine particles having a small particle size and a method for producing the same.

While studying the production of high-purity silica particles as described above, the present inventors have found that the silane alkoxide can be hydrolyzed without using the alkaline catalyst but by using the fine bubbles (micro-nano bubbles) having an average bubble diameter of 40 nm to 10 μm, so that the silica particles can be obtained.

Although details of the reason why the silica particles are produced under coexistence of the fine bubbles are unknown, the present inventors estimate as follows. That is, concentration of the silane alkoxide occurs at interfaces of the fine bubbles. When a bubble disappears, a pressure is increased and water is decomposed by a shock wave generated upon rupture to generate hydroxy radicals. This promotes the hydrolysis of the silane alkoxide.

Here, the fine bubbles used in the production method of the present invention are fine bubbles having the average bubble diameter of 40 nm to 10 μm. The fine bubbles used in the production method of the present invention include at least one of so-called nanobubbles having a bubble diameter of 40 to 100 nm (0.1 μm) and so-called microbubbles having a bubble diameter of 0.1 to 10 μm, and preferably include both.

More specifically, it is considered as follows.

Regarding the fine bubbles, a quasi-equilibrium is established in a liquid layer by Laplace force represented by an equation (1).

$$\Delta P = 4\sigma/D \tag{1}$$

(where, $\Delta P$: pressure difference between bubble internal pressure and solution, $\sigma$: surface tension, D: bubble diameter)

In many cases, the nanobubbles and the microbubbles coexist in the bubbles generated by a bubble generator. These bubbles are relatively stable if no stimulus is applied thereto. On the other hand, when a stimulus such as stirring or a change in surface tension of gas-liquid interface of the bubble is applied to the bubble, the Laplace force becomes a driving force and an equilibrium is lost. Specifically, since a gas in the bubble is pressurized by the Laplace force, when the stirring or the change in the surface tension of the gas-liquid interface of the bubble occurs, the gas is dissolved from the bubble to a liquid phase, and the Laplace force is increased according to the equation (1). Thus, the bubble shrinks and the internal pressure further increases, and eventually the bubble bursts in water and disappears. At this time, energy based on charges accumulated at the bubble interface is released together with the shock wave generated upon rupture. This causes the hydrolysis of water to generate hydroxyl radicals to decompose the silane alkoxide. It is considered that the generated silane alkoxide radical is separated into particles as a solid phase to produce the silica particles.

Here, the microbubble at the time of generation which is generated by the bubble generator is unstable compared to the nanobubble. Further, by applying some external stimulus to the microbubble, the Laplace force works to cause shrinkage of the bubble, and a time it takes for the microbubble to disappear in water via the size of the nanobubble is extremely short, and stability is bad. This is considered to be due to a difference in a state of the interface (the charges accumulated at the bubble interface) from the nanobubble (NB) at the time of generation. It is considered that the energy based on the charges accumulated at the bubble interface is released together with the shock wave generated when a microbubble-derived nanobubble ($NB_M$) bursts, which causes the hydrolysis of water to generate the hydroxyl radicals to decompose the silane alkoxide.

As mentioned above, the nanobubble (NB) is more stable than the microbubble. It is considered that this is because a high negative surface potential is formed on the nanobubble surface. In the production method of the present invention, when the microbubble and the nanobubble coexist, it is considered as follows. That is, the shock wave at the time of disappearance of the microbubble triggers the chain reaction of the shrinkage of the nanobubble, the disappearance of the nanobubble and the generation of the shock wave. Therefore, the hydroxy radical and the silane alkoxide radical are generated to promote the hydrolysis of the silane alkoxide. The shrinkage and disappearance of the nanobubble and the generation of the shock wave are slower than the shrinkage and disappearance of the microbubble and the generation of the shock wave. Therefore, it is considered that the microbubble functions as a trigger for a hydrolysis reaction. In addition, in a combined use of an ultrasonic wave and ultraviolet irradiation, it is considered as follows. That is, the stimulus such as an ultrasonic wave triggers the shrinkage and disappearance of the nanobubble and the shock wave, or the ultrasonic wave or the like causes hot spots at the nanobubble interface. This promotes the hydrolysis of water.

Further, the present inventors found that it is possible to produce silica fine particles having a small particle size, such as 3 to 10 nm in average particle size by hydrolyzing the silane alkoxide using the fine bubbles having the average bubble diameter of 40 nm to 10 μm. The present inventors consider as follows. That is, in an alkali catalyzed reaction, the hydrolysis of an alkoxy group bonded to a metal atom occurs rapidly and stepwise. On the other hand, in the reaction using the fine bubbles as in the present invention, a mechanical shock wave is applied to all bonds with equal force. Therefore, the stepwise hydrolysis reaction can be suppressed. It is believed that this has made it possible to produce the silica particles having a small particle size of 10 nm or less.

It is not clear why the fine bubbles can be stably present in the liquid. This is considered as follows. That is, salts, organic substances, inorganic substances, and the like present in the liquid suppress the fine bubbles from dissolving in an aqueous solution. Therefore, the Laplace force does not work, so that it is difficult for the gas to dissolve according to Henry's law. Therefore, the fine bubbles are metastable. However, if there is an environment in which gas dissolution is promoted, for example, physical stimulus such as vibration, breakdown of the equilibrium in liquid due to addition of the catalyst such as ammonia, or environmental change due to light, heat, or the like, it is considered that the fine bubbles shrink and disappear.

That is, the present invention relates to the silica particle dispersion containing silica fine particles having an average particle size of 3 to 10 nm. The silica particle dispersion preferably satisfies at least one of the following conditions (a) to (c), more preferably satisfies two conditions, and still more preferably satisfies all three conditions.

(a) A content of Na contained in the silica fine particles is 10 ppm or less.
(b) It contains the fine bubbles having the average bubble diameter of 40 nm to 10 μm.
(c) The total content of a nitrogen atom-containing compound contained in the entire dispersion as $NH_X$ (X is an integer of 1 to 4) is 1 ppm or less based on the silica.

Further, in the silica particle dispersion, the content of each of Al, Ca, Mg, Ti, K, Zn, Pb, Cr, Fe, Mn, Ag, Cu and Ni contained in the entire dispersion is preferably 10 ppm or less based on the silica.

Further, the present invention relates to a method for producing silica particles by hydrolyzing the silane alkoxide in a liquid phase containing the fine bubbles having the average bubble diameter of 40 nm to 10 μm. Preferably, the silica fine particles having the average particle size of 3 to 10 nm are produced. The fine bubbles are preferably bubbles containing at least one of nitrogen, hydrogen, oxygen, ozone, carbon dioxide gas, and a rare gas.

In the method for producing the silica particles, it is preferable to mix a first solution containing the silane alkoxide with a second solution containing the fine bubbles having the average bubble diameter of 40 nm to 10 μm, and the second solution preferably contains $1.0 \times 10^5$ bubbles/mL or more of the fine bubbles.

Further, in the production method, the silica particles can be produced without using the alkaline catalyst.

Furthermore, the present invention relates to a method for producing silica-based particles in which larger particles are produced using the silica fine particles having the average particle size of 3 to 10 nm produced by the above-mentioned method for producing the silica particles. That is, the method for producing the silica-based particles of the present invention includes: a fine particle preparation step of preparing silica fine particles having an average particle size of 3 to 10 nm by hydrolyzing the silane alkoxide in a liquid phase containing fine bubbles having an average bubble diameter of 40 nm to 10 μm; and a particle growth step of growing the silica fine particles by carrying out hydrolysis by adding a hydrolyzable metal compound to the dispersion containing the silica fine particles in the presence of an alkaline catalyst.

The silica-based particles produced in the particle growth step are preferably particles having an average particle size of more than 10 nm and 300 nm or less.

Further, the hydrolysis in the particle growth step is preferably performed in the presence of fine bubbles having the average bubble diameter of 40 nm to 10 μm.

The silica particle dispersion of the present invention contains the high-purity silica fine particles. Therefore, the silica particle dispersion of the present invention can be suitably used for the polishing agent for semiconductor, the raw material such as high-purity silica gel for liquid chromatography carrier, the binder for catalyst, the raw material of special zeolite, the microfiller added to the paints for electronic materials, the microfiller for polymer films, applications of seeds used in a preparation process thereof, and the like.

Further, since the method for producing the silica particles of the present invention does not use the alkaline catalyst as in the related art, it is possible to produce the silica particles with extremely high purity, which has not hitherto been available. In addition, since no alkaline catalyst is used, there is no need to perform solvent substitution or the like to remove or reduce the alkali. Therefore, there is no mixing of a new impurity, there is no disorder of uniformity accompanying aggregation of the particles, and manufacturing cost is low.

Further, in the method for producing the silica-based particles of the present invention, growth (build-up) of the particles is caused using the silica fine particles produced by the above method for producing the silica particles. Therefore, the particles having a uniform particle size distribution can be produced. In this method, by growing the particles in the presence of the fine bubbles, it is possible to suppress generation of unreacted materials, microgels, and the like and to produce the silica-based particles having more uniform particle size distribution.

Furthermore, the remaining fine bubbles which did not participate in the reaction generate the shock waves when they disappear after a lapse of time. Therefore, the remaining fine bubbles not only suppress development and growth of biological organic matter such as microorganisms and algae, but also suppress generation of microgel and promote redispersion of the generated microgel. Therefore, it is considered effective for maintaining or improving filterability.

DETAILED DESCRIPTION

«Silica Particle Dispersion»

Figure 1:
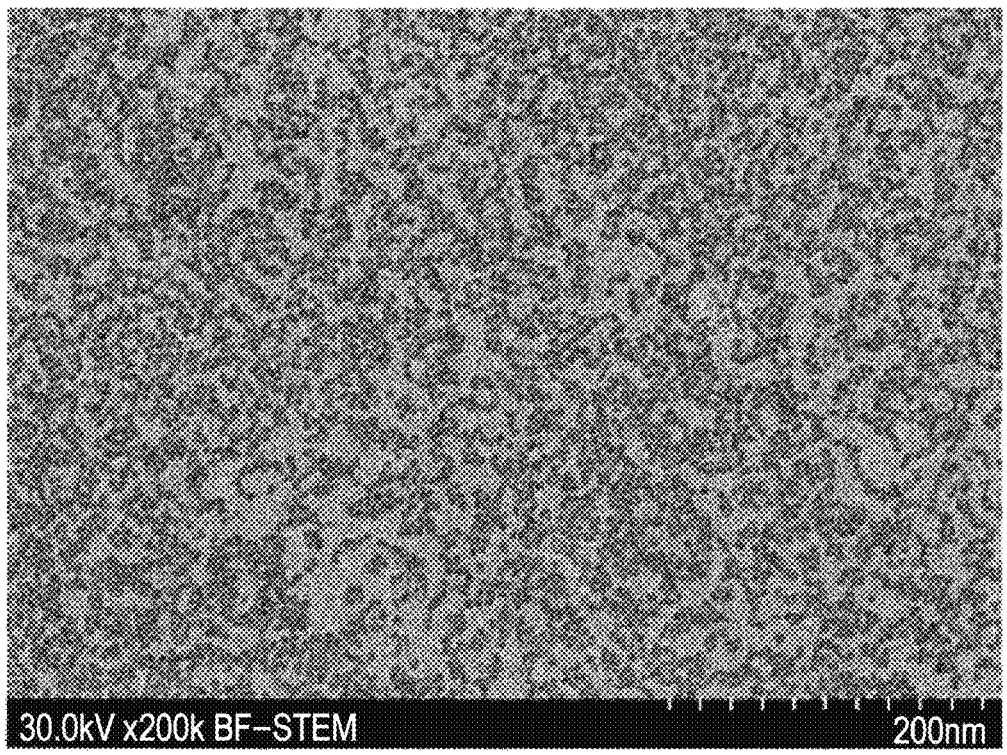
FIG. 1 is a TEM photograph of silica fine particles produced in Example 1 ($O_2$ micro-nano bubble water).

A silica particle dispersion of the present invention contains silica fine particles having an average particle size of 3 to 10 nm. The silica particle dispersion can be produced by hydrolyzing silane alkoxide in a liquid phase containing fine bubbles having an average bubble diameter of 40 nm to 10 µm.

The silica particle dispersion preferably satisfies at least one of the following conditions (a) to (c), more preferably satisfies two conditions, and still more preferably satisfies all three conditions.
(a) A content of Na contained in the silica fine particles is 10 ppm or less.
(b) It contains the fine bubbles having the average bubble diameter of 40 nm to 10 µm.
(c) The total content of a nitrogen atom-containing compound contained in the entire dispersion as $NH_X$ (X is an integer of 1 to 4) is 1 ppm or less based on silica (fine particles of 3 to 10 nm).

<Silica Fine Particles>

As described above, the silica fine particles of the present invention have the average particle size of 3 to 10 nm, and the content of Na contained in the silica fine particles is preferably 10 ppm or less, more preferably 5 ppm or less, and still more preferably 1 ppm or less. Conventionally, when water glass is used as a raw material, the silica fine particles having an average particle size of 10 nm or less have also been produced. However, Na was contained in excess of 10 ppm in the silica fine particles produced using the water glass. In contrast, the silica fine particles of the present invention are produced using the silane alkoxide as the raw material, are substantially free of Na, and are distinguishable from conventional silica fine particles which use the water glass as the raw material.

Here, the average particle size of the silica fine particles was determined by TEM observation. Specifically, the dispersion of the present invention is dried and photographed by a transmission electron microscope at a magnification of 250,000. Particle sizes of arbitrary 500 particles in an obtained photographic projection view were measured, and an average value was taken as the average particle size of the silica fine particles.

Further, an amount of Na contained in the silica fine particles is a value determined by analyzing a silica particle dispersion (A) obtained by ion exchange of a prepared silica particle dispersion with a cation exchange resin by ICP mass spectrometry.

Further, a specific surface area of the silica fine particles is preferably 270 to 900 $m^2/g$, and more preferably 400 to 700 $m^2/g$. When the specific surface area of the silica fine particles is less than 270 $m^2/g$, it is difficult to obtain monodispersed particles. Therefore, there is a problem that a viscosity of the dispersion is increased. On the other hand, when the specific surface area exceeds 900 $m^2/g$, the silica fine particles are likely to be dissolved or aggregated. Therefore, there is a problem that it is difficult to obtain the monodispersed particles.

Here, the specific surface area of the silica fine particles is a value obtained by BET method after drying the dispersion of the present invention.

An amount of surface charge of the silica fine particles is preferably 260 to 900 µeq/g, and more preferably 350 to 750 µeq/g. When the amount of surface charge of high-purity silica fine particles is less than 260 µeq/g, since hydrolysis is insufficient, there is a problem that negative charge of silica particles is small, and aggregation is likely to occur. On the other hand, when the amount of surface charge exceeds 900 µeq/g, there is a problem that stability of the silica particles is easily impaired.

The amount of surface charge of the silica fine particles is a value determined by dropping a cationic polymer (0.0025N diallyldimethyl ammonium chloride solution produced by WAKO) of known concentration into the dispersion using a flow potential meter (PCD-500 manufactured by Kyoto Electronics Manufacturing Co., Ltd.) and determined from consumption of the polymer at which the negative charge is neutralized.

<Fine Bubbles (Micro-Nano Bubbles)>

The silica particle dispersion of the present invention preferably contains the fine bubbles having the average bubble diameter of 40 nm to 10 µm. The fine bubbles include at least one of so-called nanobubbles having a bubble diameter of 40 to 100 nm (0.1 µm) and so-called microbubbles having a bubble diameter of 0.1 to 10 µm, and preferably include both. An upper limit of the average bubble diameter of the fine bubbles is preferably 500 nm, more preferably 350 nm, and still more preferably 200 nm. Further, a lower limit of the average bubble diameter of the micro-nano bubbles is preferably 50 nm, more preferably 60 nm, and still more preferably 65 nm.

That is, in the silica particle dispersion, the fine bubbles not used for a reaction usually remain. The content of the fine bubbles contained in the silica particle dispersion is not particularly limited. However, a lower limit thereof is preferably $1.0\times10^3$ bubbles/mL, more preferably $1.0\times10^5$ bubbles/mL, and still more preferably $1.0\times10^8$ bubbles/mL. An upper limit thereof is preferably $1.0\times10^{11}$ bubbles/mL, more preferably $5.0\times10^{10}$ bubbles/mL, and still more preferably $1.0\times10^{10}$ bubbles/mL.

The average bubble diameter and the number of bubbles of the fine bubbles can be determined by analyzing velocity of Brownian motion of the bubbles in the liquid by nanoparticle tracking analysis (NTA). The average bubble diameter and the number of bubbles of the fine bubbles can be measured using, for example, NanoSight NS300 manufactured by Malvern Inc.

In the current technology, it is difficult to measure the average bubble diameter and the number of bubbles of the fine bubbles as it is in the dispersion in which the silica particles and the fine bubbles coexist. Therefore, the silica particles are removed by an ultrafiltration membrane, so that only the fine bubbles are left, and the average bubble diameter and the number of bubbles of the fine bubbles are measured by measuring this. That is, the average bubble diameter and the number of bubbles of the present invention mean values measured from a filtrate which has passed through the ultrafiltration membrane having a fractional molecular weight of 6000.

A gas for forming the fine bubbles is preferably at least one of nitrogen, hydrogen, oxygen, ozone, carbon dioxide gas, and a rare gas. These gases have an effect of destroying biological cells by shock waves when they disappear, and thus are effective against biological contamination and for long-term storage.

<Silica Particle Dispersion>

In the silica particle dispersion of the present invention, the total content of the nitrogen atom-containing compound as $NH_X$ (X is an integer of 1 to 4) based on the silica is preferably 1 ppm or less, more preferably 0.5 ppm or less, and still more preferably 0.1 ppm or less. That is, since the silica particle dispersion can be produced without using an alkaline catalyst containing the nitrogen atom-containing compound such as ammonia or an amine compound, it contains substantially no nitrogen source.

The total content of $NH_X$ of the nitrogen atom-containing compound means the total content based on the following ammonia analysis method and amine analysis method.

(1) Ammonia Analysis Method

Measurement by Kjeldahl method is performed. Specifically, a sample is thermally decomposed using sulfuric acid or the like to change nitrogen in the sample to ammonium sulfate. Next, decomposition solution is made alkaline, liberated ammonia is distilled, and an amount of the ammonia is measured by titration.

(2) Amine Analysis Method

Measurement by ion chromatography is performed. Specifically, quantification is performed by determining the content from a calibration curve by directly introducing the sample into an ion chromatograph (apparatus type: ICS-1000).

When the total content of the nitrogen atom-containing compound as $NH_X$ (X is an integer of 1 to 4) exceeds 1 ppm based on the silica, for example, if a wiring node formed on a semiconductor wafer is used to form wiring having a fineness of 32 nm or less, there is a concern that the amine compound or the like is captured at wafer interconnects, and a resist is contaminated, resulting in production defects. That is, a nitrogen-containing compound contaminates the wafer and a production line, and there is a concern that this may lead to defect generation, a decrease in electrical properties such as anomalous leak current of circuits or elements formed on the wafer, or a reduction in yield. Further, there is a concern that the hydrolysis of non-hydrolyzate proceeds with time, which may change the stability of the dispersion.

In the silica particle dispersion of the present invention, the content of each of Al, Ca, Mg, Ti, K, Zn, Pb, Cr, Fe, Mn, Ag, Cu and Ni based on the silica is preferably 10 ppm or less, more preferably 1 ppm or less, and still more preferably 0.5 ppm or less.

When the content of each of Al, Ca, Mg, Ti, K, Zn, Pb, Cr, Fe, Mn, Ag, Cu and Ni based on the silica exceeds 10 ppm, since a surface potential of the particles is reduced, there arises a problem that the stability is impaired and the insulating properties, the electrical properties and the like of the coating film are easily changed.

The content of each of Al, Ca, Mg, Ti, K, Zn, Pb, Cr, Fe, Mn, Ag, Cu and Ni in the silica particle dispersion is a value determined by ICP mass spectrometry.

«Method for Producing Silica Particle Dispersion (Seed)»

The method for producing the silica particle dispersion of the present invention is characterized in that the silane alkoxide is hydrolyzed in the liquid phase containing the fine bubbles having the average bubble diameter of 40 nm to 10 μm to produce the silica particle dispersion. A specific method is not particularly limited if the silica particle dispersion is produced by the hydrolysis of the silane alkoxide. For example, there are a method (mixing method) of promoting the hydrolysis of the silane alkoxide by mixing a first solution containing the silane alkoxide as the raw material and a second solution containing the fine bubbles having the average bubble diameter of 40 nm to 10 μm, and a method (generation method) of promoting the hydrolysis of the silane alkoxide by generating the fine bubbles in the liquid phase in which the silane alkoxide exists. As the mixing methods, various methods such as a method of adding one solution to the other solution at once, a method of dropping the other solution to the one solution, and a method of dropping both the solutions to a liquid previously prepared in a container can be adopted.

The silica particles produced by this production method are preferably silica fine particles having the average particle size of 3 to 10 nm, but not limited thereto. For example, larger particles can also be produced using the silica fine particles having the average particle size of 3 to 10 nm as seeds. At this time, use of the alkaline catalyst containing the nitrogen-containing compound such as ammonia or the amine compound is not prohibited. However, it is preferable to use the alkaline catalyst containing a phosphorus-containing compound so as not to form the dispersion or the particles containing the nitrogen-containing compound. The alkaline catalyst containing the phosphorus-containing compound is preferably phosphonium hydroxide, particularly preferably tetrabutylphosphonium hydroxide.

<Silane Alkoxide>

In the method for producing the silica particles, the silane alkoxide represented by the following formula (2) is suitably used.

$$X_nSi(OR)_{4-n} \tag{2}$$

In the formula, X represents a hydrogen atom, a fluorine atom, an alkyl group having 1 to 8 carbon atoms, an aryl group or a vinyl group. R represents a hydrogen atom, an alkyl group having 1 to 8 carbon atoms, an aryl group or a vinyl group. n is an integer of 0 to 3.

Specifically, tetramethylalkoxysilane, tetraethylalkoxysilane and the like can be suitably used. Further, two or more silane alkoxides may be used.

For example, alcohols such as methanol, ethanol, propanol and butanol, acetone, toluene, xylene, tetrahydrofuran and the like can be used as the solvent (solvent of the first solution in the case of the mixing method) for dispersing and dissolving the silane alkoxide.

<Fine Bubbles (Micro-Nano Bubbles)>

The fine bubbles used in this production method are fine bubbles having the average bubble diameter of 40 nm to 10 μm. The fine bubbles include at least one of so-called nanobubbles having the bubble diameter of 40 to 100 nm (0.1 μm) and so-called microbubbles having the bubble diameter of 0.1 to 10 μm, and preferably include both. Further, the upper limit of the average bubble diameter of the fine bubbles is preferably 500 nm, more preferably 350 nm, and still more preferably 200 nm. The lower limit of the average bubble diameter of the micro-nano bubbles is preferably 50 nm, more preferably 60 nm, and still more preferably 65 nm.

Here, it is not preferable that the average bubble diameter of the fine bubbles exceeds 10 μm because surface tension of the particles in an aqueous solution is reduced and coalescence of the bubbles easily occurs, and since life of the bubbles is short, it is not suitable for causing an efficient reaction. Further, when the average bubble diameter of the fine bubbles is less than 40 nm, the surface tension is increased and an internal pressure of the bubbles is increased, so that rupture is likely to occur and a stabilization period is short. That is, there is an optimum range of bubble sizes. It does not mean that the bubbles may be of any size if they are the bubbles.

An amount of the fine bubbles based on the silane alkoxide is appropriately set within a range in which the hydrolysis of the silane alkoxide sufficiently proceeds. For example, in the mixing method, the second solution having a fine bubble content of preferably $1.0 \times 10^5$ bubbles/mL or more, more preferably $1.0 \times 10^8$ bubbles/mL or more is charged into the first solution. An upper limit of the fine bubble content in the second solution is preferably $1.0 \times 10^{11}$ bubbles/mL, more preferably $5.0 \times 10^{10}$ bubbles/mL, and still more preferably $1.0 \times 10^{10}$ bubbles/mL.

Here, when the content of the fine bubbles of the second solution is less than $1.0 \times 10^5$ bubbles/mL, there is a possibility that the hydrolysis of the silane alkoxide for generating the silica particles may be insufficient. When the content exceeds $1.0 \times 10^{11}$ bubbles/mL, reaction rate is fast and it is difficult to obtain reproducibility.

Further, it is preferable to add the second solution containing the fine bubbles in an amount as described above, in an amount of 0.5 mol times to 10 mol times the number of moles of functional group (OR) of the silane alkoxide. Here, if the second solution is used more than 10 mol times, there is a problem that cracking occurs due to remaining water during drying of compound and evaporation at the time of heat treatment. If it is less than 0.5 mol times, there is a possibility that the hydrolysis may be insufficient and the reaction stops in the middle.

The gas used for the fine bubbles preferably includes at least one of nitrogen, hydrogen, oxygen, ozone, carbon dioxide gas, and the rare gas. Since these gases can generate hydroxyl radicals, it is possible to produce an effect of crushing microgel by the rupture of the fine bubbles at the same time. In addition, since the shock waves at the time of the disappearance of the fine bubbles secondarily produce the effect of destroying biological cells, these gases are effective against biological contamination and for long-term storage.

A method for generating the fine bubbles (micro-nano bubbles) is not especially limited, but conventionally well-known methods can be used. The methods include, for example, various types such as a swirl flow type, a static mixer type, an ejector type, a venturi type, a pressure dissolution type, a pore type, a rotary type, an ultrasonic type, a vapor condensation type, and an electrolysis type. Further, it is possible to increase concentration of the micro-nano bubbles or to miniaturize them by repeatedly passing them through the solution.

The hydrolysis reaction of the silane alkoxide can usually be carried out at 5 to 95° C. under normal pressure, and is preferably carried out at a temperature lower than a boiling point of the solvent. In the case of the mixing method, this reaction is preferably carried out at a temperature lower than a boiling point of the first solution or the second solution, whichever is lower. Further, the reaction may also be carried out under pressure, in a temperature range that does not boil. Further, the solution containing the silane alkoxide and the fine bubbles may be irradiated with ultraviolet light or ultrasonic waves. Since this accelerates the hydrolysis reaction of the silane alkoxide more quickly, the silica particles can be produced in a short time, which is economical.

Here, when the mixing method is used, water is mainly used as the solvent of the second solution. It is preferable to use an organic solvent compatible with the solvent of the first solution together with water because it can increase the concentration of the fine bubbles. Such an organic solvent is preferably, for example, dimethyl sulfoxide (DMSO), acetic acid (AcOH), N, N-dimethylformamide (DMF), methanol (MeOH), ethyl acetate (AcOEt), acetone or the like. The total number of fine bubbles tends to be increased as the viscosity and dielectric constant of the organic solvent are higher.

Here, using ultrafiltered water containing the fine bubbles, which is produced by ultrafiltration, when producing the fine bubbles is a resource saving process, and it is also possible to reduce the contamination of impurities such as metals. It is preferable to use the ultrafiltered water as the second solution, because the fine bubbles are fractionated by the ultrafiltration membrane, so that there is an advantage that the life of the fine bubbles is extended and high concentration fine bubbles can be used.

«Method for Producing Silica-Based Particle Dispersion»

In the method for producing the silica-based particle dispersion (preferably, the average particle size of the silica-based particles is more than 10 nm and 300 nm or less) of the present invention, the silica fine particles (the average particle size is 3 to 10 nm) produced by the production method of the above-described present invention using the fine bubbles are hydrolyzed as the seeds (seed particles) in the presence of alkali to cause growth (build-up) of the particles. Therefore, it is preferable to use what was replaced by water solvent as seed dispersion.

That is, the method for producing the silica-based particle dispersion has: a fine particle preparation step of preparing the silica fine particles having the average particle size of 3 to 10 nm by hydrolyzing the silane alkoxide in the liquid phase containing fine bubbles having the average bubble diameter of 40 nm to 10 μm; and a particle growth step of growing the silica fine particles by carrying out the hydrolysis by adding a hydrolyzable metal compound to the dispersion containing the silica fine particles in the presence of the alkaline catalyst. Here, it is also possible to use the hydrolyzable metal compound which has been partially hydrolyzed as the hydrolyzable metal in the present invention.

Note that an operation in the fine particle preparation step is the same as the operation described in the above section of "«Method for producing silica particle dispersion»".

According to this production method, it is possible to perform multi-step (multiple times) growth of the particles using the fine particles as the seeds (seed particles). Therefore, the particles having a uniform particle size distribution can be produced. Specifically, even in the case of producing relatively small particles, the particles having the uniform particle size distribution can be produced from fine seeds because the particles can be grown in multiple steps.

In the method for producing the silica-based particle dispersion, preferably, in the particle growth step, the organic solvent is removed to stabilize the seeds (seed particles), and the seed dispersion dispersed in water is aged at a predetermined pH. Thus, uniformity of the particles accompanying dissolution of the particles in the dispersion, uniformity of silica solubility in the dispersion, and the like are achieved. In the present specification, this stabilization operation is referred to as seeding. The pH in seeding is not particularly limited if it is in a neutral to alkaline region. However, the pH is preferably 7 or more, and more preferably 7 to 10.5. An aging temperature of the dispersion at this time is not particularly limited if the seeds are stabilized. The aging temperature is preferably from room temperature to less than 100° C. under normal pressure. Further, in order to stabilize the seeds, it is preferable to age them for about 5 minutes or more. This stabilization of the seeds by seeding can be suitably applied to both cases of using the above-described 3 to 10 nm silica fine particles as the seeds and of using the particles larger than 10 nm as the seeds. For example, by performing aging such as heating in the presence of the alkali catalyst, it is possible to achieve uniformity of the particles accompanying dissolution of the particles in the dispersion, uniformity of silica solubility in the dispersion, and the like. This step is a step preferably performed when producing uniform particles by subsequent growth of the particles and further multi-step growth of the particles.

In the particle growth step, reaction temperature, pH, amount of seeds, type and addition amount of hydrolyzable silicon compound, speed of addition, and the like are appropriately controlled. In the present invention, for example, when using the hydrolyzable silicon compound, if a concentration of seed solution used is too high, or if the pH of the seed solution is in an acidic region, growth of the seeds may be inhibited and uniform particle growth may be difficult for the following reasons. That is, in these cases, the silica particles are unstable and the silica solubility decreases. Therefore, since the added hydrolyzable silicon compound is precipitated as low molecular weight silica, and new core particles and by-products such as monomers and oligomers are generated, the growth of the seeds is inhibited. Therefore, the seed solution is preferably the aqueous solution in the neutral to alkaline region, which is adjusted to an appropriate concentration.

Further, when growing the seeds by continuously adding the hydrolyzable silicon compound in the particle growth step, if the silicon compound to be added is excessive to the amount of the seeds, and degree of supersaturation is abnormally high, or the speed of addition is too high, the silicon compound is precipitated as the low molecular weight silica, and the new core particles and the by-products such as monomers and oligomers are generated. Therefore, there is a possibility that not only the growth of the seeds is inhibited, but also the particle size distribution of the obtained particles is broadened. Therefore, it is preferred that the addition amount, the speed of addition, and the like of the hydrolyzable silicon compound added in the growth of the particles are adjusted in accordance with the amount of the seeds.

In the particle growth step, in order to prevent non-uniform particle growth due to such core generation and generation of the by-products and to obtain the particles having more uniform particle size distribution, it is preferable to repeat removing such by-products, the organic solvent which is a by-product derived from the hydrolysis of an alkoxy group, and an unnecessary alkali from the dispersion of the particles grown to some extent, and causing growth of purified particles as new seed particles, in a process of the growth of the particles. The growth of the particles per one time of the multi-step growth of the particles is preferably within 3 times the average particle size of reference seed particles as a guide.

Here, adding the hydrolyzable metal compound continuously without adding the hydrolyzable metal compound in multiple steps in order to grow the particles to a desired particle size takes too much time for the growth of the particles, and thus it is poor in practicality. In addition, when a large amount of the hydrolyzable metal compound is added in a short time, there is a possibility that the new seed particles and the by-products such as monomers and oligomers are generated, and the particle size distribution of the obtained particles is also widened as described above.

That is, it is preferable to perform, for example, about 2 to 5 particle growth steps until the particles of a target size are obtained. By using the fine particles as the seeds, a desired number of particle growth steps can be performed even when producing relatively small particles having the average particle size of more than 10 nm and 300 nm or less, preferably more than 10 nm and about 100 nm or less. Therefore, it is possible to produce the particles having the uniform particle size distribution.

The hydrolysis in the particle growth step is preferably carried out in the presence of the fine bubbles having the average bubble diameter of 40 nm to 10 μm. Since the hydrolysis is carried out in the presence of the fine bubbles, by dispersion effect, crushing effect, hydrolysis promotion effect, and the like by the fine bubbles, it is possible to suppress generation of the hydrolyzable metal compound (unreacted raw material, low molecular weight hydrolyzate thereof, or the like) whose reaction has not progressed to a target particle, and generation of the microgel and the like generated by reaction of the hydrolyzable metal compound with the silica-based particles. This makes it possible to produce the particles having the more uniform particle size distribution.

Further, the remaining fine bubbles which did not participate in the reaction generate the shock waves when they disappear after a lapse of time. Therefore, the remaining fine bubbles not only suppress development and growth of biological organic matter such as microorganisms and algae, but also suppress generation of microgel and promote redispersion of the generated microgel. Therefore, the fine bubbles are considered to be effective for maintaining or improving filterability.

Here, the fine bubbles are the same as those described in the above section "«Method for producing silica particle dispersion»", and thus description thereof will be omitted.

Hydrolyzable metal compounds used in the particle growth step include compounds containing a metal such as silicon, titanium, zirconia, aluminum, tin or indium, and having a hydrolyzable group such as an alkoxy group or a halogen group, chelate compounds containing the above metals, peroxo compounds containing the above metals, and the like. In the particle growth step of the present invention, it is preferable to use at least the hydrolyzable metal compound containing silicon. The hydrolyzable metal compound containing silicon can be used alone or together with a hydrolyzable compound containing another metal. Note that it is also possible to use the hydrolyzate which has been partially hydrolyzed and has a hydroxyl group in its molecule as the hydrolyzable compound.

Specifically, as the hydrolyzable compound containing silicon, at least one of silane alkoxide and silicic acid can be used.

As the silane alkoxide, the silane alkoxide represented by the general formula (2) can be preferably used. Among them, tetramethylalkoxysilane and tetraethylalkoxysilane are more preferable, and tetramethylalkoxysilane is particularly preferable.

Further, as the silicic acid, what was prepared from alkali metal silicate can be used. For example, a solution containing the silicic acid can be obtained by ion exchange of a dilute solution of sodium silicate (water glass) with the cation exchange resin or the like, and this can be used. When a high-purity silica-based particle dispersion is required, it is preferable to further carry out separation of high molecular weight substances by the ultrafiltration membrane, or treatment with a chelate resin, an amphoteric ion exchange resin, the cation exchange resin, or the like, for the solution containing the silicic acid.

Examples of the hydrolyzable compounds containing titanium include tetramethoxy titanium, tetraisopropoxy titanium, tetra-n-butyl titanium, butyl titanate dimer, tetraoctyltitanium, titanium tetrachloride, titanium acetylacetonate, titanium tetraacetylacetonate, titanium lactate ammonium salt, titanium triethanolaminate, and peroxo titanic acid.

Examples of the hydrolyzable compounds containing zirconia include tetramethoxy zirconium, tetraethoxy zirconium, tetraisopropoxy zirconium, n-propyl zirconate, n-butyl zirconate, zirconium chloride, zirconium oxychloride, zirconium dibutoxy bis(ethylacetoacetonate), zirconium tetraacetylacetonate, and peroxo zirconic acid.

Examples of the hydrolyzable compounds containing aluminum include trimethoxy aluminum, triethoxy aluminum, triisopropoxy aluminum, aluminum secondary butoxide, aluminum chloride, aluminum acetate, aluminum tris (acetylacetonate), aluminum bis(ethylacetoacetate) monoacetylacetonate, and aluminum tris(ethylacetoacetate).

Examples of the hydrolyzable compounds containing tin include tetraisopropoxy tin, tetra-n-butoxy tin, tin (IV) chloride, and tin octylate.

Examples of the hydrolyzable compounds containing indium include trimethoxy indium, triethoxy indium, triisopropoxy indium, indium chloride, and indium triacetylacetonate.

The reaction in the particle growth step is preferably performed in the presence of the water solvent containing the fine bubbles having the average bubble diameter of 40 nm to 10 µm and the alkaline catalyst. Therefore, the solvent of the seed solution is preferably replaced by water. Here, when the hydrolyzable silicon compound or the hydrolyzable metal compound (metal compound other than silicon) with high hydrolysis rate and easy precipitation is added to the solution containing the silica fine particles, water and the alkaline catalyst, it is preferable to use the organic solvent or a mixed solvent of water and the organic solvent as the solvent for the hydrolyzable metal compound. When the reaction is carried out under normal pressure, it is preferable to use a reflux unit so that the solvent does not evaporate. Further, when the reaction is carried out at a temperature of the boiling point or more of the solvent (100° C. or more in the case of water), a heat and pressure resistant container such as an autoclave can also be used. Note that it is preferable that the organic solvent and the like which are by-produced by the hydrolysis and are contained in the silica-based particle dispersion produced are replaced by water.

The organic solvents include alcohols, ketones, ethers, esters and the like. More specifically, for example, alcohols such as methanol, ethanol and propanol, ketones such as methyl ethyl ketone and methyl isobutyl ketone, and esters such as methyl acetate, ethyl acetate, methyl lactate and ethyl lactate are used. Among them, methanol or ethanol is more preferable, and methanol is particularly preferable. The organic solvents may be used alone or in combination of two or more.

As the alkaline catalyst, compounds exhibiting basicity such as ammonia, amines, alkali metal hydrides, alkaline earth metal hydrides, alkali metal hydroxides, alkaline earth metal hydroxides, quaternary ammonium compounds, and amine coupling agents are used.

«Silica-Based Particle Dispersion»

The silica-based particle dispersion of the present invention is characterized by including the silica-based particles having the average particle size of more than 10 nm and 300 nm or less and the fine bubbles having the average bubble diameter of 40 nm to 10 µm. The silica-based particle dispersion can be obtained by the method for producing the silica-based particle dispersion of the present invention. Note that the fine bubbles are the same as those described in the above section of "«Silica particle dispersion»".

«Silica-Based Particles»

The silica-based particles of the present invention mean the particles containing only silica (silicon) as a main component, or the particles containing two or more kinds of metal oxides containing silicon and at least one element selected from titanium, zirconia, aluminum, tin and indium as the main component. The particles containing two or more kinds of metal oxides as the main component specifically include an aspect in which a composite metal oxide layer (shell layer) containing silicone and at least one metal selected from titanium, zirconia, aluminum, tin, and indium is formed on a surface of core particles including the silica fine particles.

Here, the main component is 60 mass % or more, preferably 95 mass % or more, more preferably 98 mass % or more, still more preferably 99.5 mass % or more, and most preferably 100 mass % based on the oxide for the whole substance constituting the particles.

The average particle size of the silica-based particles is more than 10 nm and 300 nm or less as described above. The average particle size is preferably more than 10 nm and 200 nm or less, and more preferably more than 10 nm and 100 nm or less.

A method for measuring the average particle size is the same as the method for measuring the average particle size of the silica fine particles (TEM observation).

In the silica-based particles, a coefficient of variation (CV value) of the particles is, for example, 0.3 or less, preferably 0.25 or less, more preferably 0.20 or less, and still more preferably 0.15 or less.

The coefficient of variation (=standard deviation/average particle size) is calculated based on the average particle size determined by the method (TEM observation) for measuring the average particle size of the silica fine particles.

Further, in the silica-based particles, since densification of the particles is promoted by hydrolysis treatment, the specific surface area is preferably 9 m$^2$/g or more and less than 270 m$^2$/g, and more preferably 27 m$^2$/g or more and less than 270 m$^2$/g.

When the specific surface area of the silica-based particles is less than 9 m$^2$/g, the particles themselves are large and easily precipitated. On the other hand, when the specific surface area is 270 m$^2$/g or more, since the particles are small, when a large amount of salt is present in a reaction system, the stability of the silica-based particles is low, which causes a problem that gelation is likely to occur.

A method for measuring the specific surface area is the same as the method for measuring the specific surface area of the silica fine particles.

The amount of surface charge of the silica-based particles and the silica fine particles is preferably 14 to 900 µeq/g.

The amount of surface charge changes mainly by (1) the surface area of the particles and (2) hydrolyzability (reaction of the alkoxy groups being hydrolyzed to form hydroxyl groups) on the surface of the particles. In any case, the amount of surface charge per particle solid content (g) largely changes depending on an amount of hydroxyl groups involved in negative charge generation of the particles. Specifically, in the silica-based particles prepared under high temperature, an influence of (1) is large. An influence of (2) is large in the above-described silica fine particles (seeds) prepared under low temperature.

Therefore, in the silica-based particles having the average particle size of more than 10 nm and 300 nm or less, the amount of surface charge is preferably 14 to 420 µeq/g, and more preferably 42 to 420 µeq/g. Here, when the amount of surface charge of the high-purity silica-based particles is less than 14 µeq/g, the particles themselves are large and easily precipitated. On the other hand, when it exceeds 420 µeq/g, since many relatively small particles are present, its viscosity is increased by concentration, which causes the problem that the gelation is likely to occur. At this time, when a large amount of salt is present in the reaction system, an increase in viscosity of the silica-based particle dispersion is accelerated, and the gelation is more likely to occur.

Further, as described above, it is preferable that the amount of surface charge of the silica fine particles (seeds) having the average particle size of 3 to 10 nm used to produce the silica-based particles is 260 to 900 µeq/g.

A method for measuring the amount of surface charge is the same as the method for measuring the amount of surface charge of the silica fine particles.

<Silica-Based Particle Dispersion>

In the silica-based particle dispersion of the present invention, when high purity is required, for example, for a semiconductor polishing material or the like, the content of each of alkali metal, alkaline earth metal, Zn, Pb, Ag, Mn, Co, Mo, Cu, Ni, Cr, U, and Th based on the silica is preferably 10 ppm or less, more preferably 1 ppm or less, and still more preferably 0.5 ppm or less.

When the content of each of the metals based on the silica exceeds 10 ppm, there is a problem that the surface potential of the particles is reduced, the stability is impaired, and the insulating properties, the electrical properties and the like of the coating film are easily changed.

A method for measuring the content of the metal is the same as the method for measuring the content of the metal of the silica particle dispersion.

EXAMPLES

Example 1

The solution (first solution) was prepared by adding 0.49 g of tetraethoxysilane to 22 g of denatured ethyl alcohol (AP-11) with stirring. Further, as a bubble aqueous solution which is the second solution, $O_2$ micro-nano bubble water (average bubble diameter: 70 nm, bubble number: 240 million bubbles/mL) was prepared by contacting water and $O_2$ by a swirl-flow bubble-generator (HYK-20-SD manufactured by Ligaric Co., Ltd.). The silica particle dispersion of Example 1 was obtained by adding 25 g of the second solution to the first solution, and reacting them at 25° C. for 5 hours.

The average particle size of the silica particles in the silica particle dispersion of Example 1 was 5 nm, and uniform fine particles were obtained as shown in FIG. 1. Further, the silica particle dispersion of Example 1 in which the silica particles and the fine bubbles coexist was filtered through the ultrafiltration membrane (SIP-1013 fractional molecular weight 6000, produced by Asahi Kasei Corporation) to remove the silica particles, and the average bubble diameter and the number of bubbles of the nanobubbles in the filtrate were measured. As a result, they were respectively 75 nm and 150 million bubbles/mL. Processing conditions and the like and each measurement result are shown in Table 1.

[Average Particle Size of Silica Particles]

The average particle size of the silica particles was measured by image analysis. Specifically, the silica particle dispersion was dried on a collodion film of a copper cell for the electron microscope, and photographed at the magnification of 250,000 to obtain the photographic projection view by the transmission electron microscope (H-800 manufactured by Hitachi, Ltd.). The particle sizes of arbitrary 500 particles in the obtained photographic projection view were measured, and the average value was taken as the average particle size of the silica particles.

[Average Bubble Diameter and Bubble Number of Nanobubbles]

With respect to the average bubble diameter and the number of bubbles of the nanobubbles, the velocity of the Brownian motion of the bubbles in the liquid was measured using a nanoparticle tracking analysis. Specifically, about 20 mL of a measurement sample (the second solution or the filtrate of the silica particle dispersion of Example 1) was injected into a measurement device (NanoSight NS300 manufactured by Malvern Inc.) while being aspirated, and was measured by the nanoparticle tracking analysis.

[Amount of Na in Silica Fine Particles]

With respect to the amount of Na contained in the silica fine particles, the silica particle dispersion (A) obtained by ion-exchanging the prepared silica particle dispersion with the cation exchange resin was measured by ICP mass spectrometry.

[Total Content of $NH_X$ in Dispersion]

The total content of $NH_X$ of the compound containing a nitrogen atom was determined by performing measurements based on each of the following ammonia analysis method and amine analysis method, and summing the respective measured values.

(1) Ammonia Analysis Method

Measurement by Kjeldahl method was performed. Specifically, the sample was thermally decomposed using sulfuric acid or the like to change nitrogen in the sample to ammonium sulfate. Next, the decomposition solution was made alkaline, liberated ammonia was distilled, and the amount of the ammonia was measured by titration.

(2) Amine Analysis Method

Measurement by ion chromatography was performed. Specifically, quantification was performed by determining the content from the calibration curve by directly introducing the sample into the ion chromatograph (apparatus type: ICS-1000).

[Content of Al Etc. In Dispersion]

The contents of Al, Ca, Mg, Ti, K, Zn, Pb, Cr, Fe, Mn, Ag, Cu and Ni in the silica particle dispersion were determined by ICP mass spectrometry.

Example 2

The solution (first solution) was prepared by adding 0.49 g of tetraethoxysilane to 22 g of denatured ethyl alcohol (AP-11) with stirring. Further, as the bubble aqueous solution which is the second solution, $N_2$ micro-nano bubble water (average bubble diameter: 79 nm, bubble number: 200 million bubbles/mL) was prepared by contacting water and $N_2$ by the swirl-flow bubble-generator (HYK-20-SD manufactured by Ligaric Co., Ltd.). The silica particle dispersion of Example 2 was obtained by adding 25 g of the second solution to the first solution, and reacting them at 25° C. for 5 hours.

Figure 2:
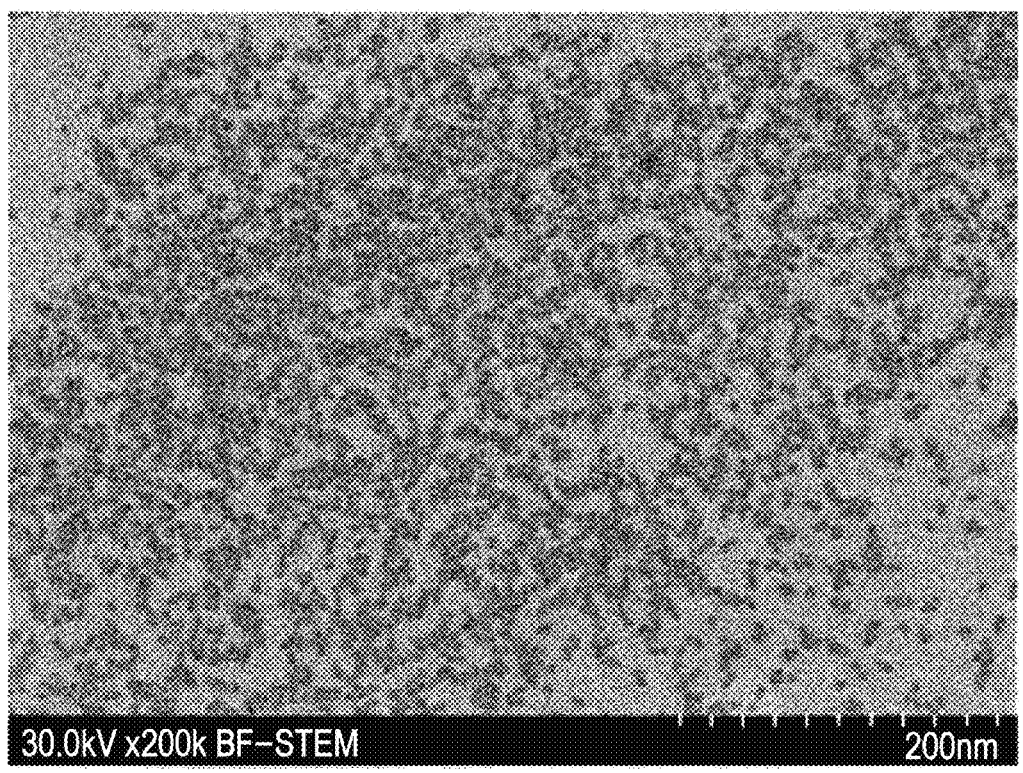
FIG. 2 is a TEM photograph of the silica fine particles produced in Example 2 ($N_2$ micro-nano bubble water).

The average particle size of the silica particles in the silica particle dispersion of Example 2 was 5 nm, and uniform fine particles were obtained as shown in FIG. 2. Further, the silica particle dispersion of Example 2 in which the silica particles and the fine bubbles coexist was filtered through the ultrafiltration membrane (SIP-1013 fractional molecular weight 6000, produced by Asahi Kasei Corporation) to remove the silica particles, and the average bubble diameter and the number of bubbles of the nanobubbles in the filtrate were measured. As a result, they were respectively 80 nm and 140 million bubbles/mL. The processing conditions and the like and each measurement result are shown in Table 1.

Example 3

The solution (first solution) was prepared by adding 0.49 g of tetraethoxysilane to 22 g of denatured ethyl alcohol (AP-11) with stirring. Further, as the bubble aqueous solution which is the second solution, $O_3$ micro-nano bubble water (average bubble diameter: 65 nm, bubble number: 160 million bubbles/mL) was prepared by contacting water and $O_3$ by the swirl-flow bubble-generator (HYK-20-SD manufactured by Ligaric Co., Ltd.). The silica particle dispersion of Example 3 was obtained by adding 25 g of the second solution to the first solution, and reacting them at 25° C. for 5 hours.

The average particle size of the silica particles in the silica particle dispersion of Example 3 was 5 nm. Further, the silica particle dispersion of Example 3 in which the silica particles and the fine bubbles coexist was filtered through the ultrafiltration membrane (SIP-1013 fractional molecular weight 6000, produced by Asahi Kasei Corporation) to remove the silica particles, and the average bubble diameter and the number of bubbles of the nanobubbles in the filtrate were measured. As a result, they were respectively 70 nm and 150 million bubbles/mL. The processing conditions and the like and each measurement result are shown in Table 1.

Example 4

The solution (first solution) was prepared by adding 0.49 g of tetraethoxysilane to 22 g of denatured ethyl alcohol (AP-11) with stirring. Further, as the bubble aqueous solution which is the second solution, Ar micro-nano bubble water (average bubble diameter: 75 nm, bubble number: 160 million bubbles/mL) was prepared by contacting water and a rare gas (Ar) by the swirl-flow bubble-generator (HYK-20-SD manufactured by Ligaric Co., Ltd.). The silica particle dispersion of Example 4 was obtained by adding 25 g of the second solution to the first solution, and reacting them at 25° C. for 5 hours.

The average particle size of the silica particles in the silica particle dispersion of Example 4 was 5 nm. Further, the silica particle dispersion of Example 4 in which the silica particles and the fine bubbles coexist was filtered through the ultrafiltration membrane (SIP-1013 fractional molecular weight 6000, produced by Asahi Kasei Corporation) to remove the silica particles, and the average bubble diameter and the number of bubbles of the nanobubbles in the filtrate were measured. As a result, they were respectively 77 nm and 140 million bubbles/mL. The processing conditions and the like and each measurement result are shown in Table 1.

Example 5

The solution (first solution) was prepared by adding 0.49 g of tetraethoxysilane to 22 g of denatured ethyl alcohol (AP-11) with stirring. Further, as the bubble aqueous solution which is the second solution, the $N_2$ micro-nano bubble water (average bubble diameter: 291 nm, bubble number: 110 million bubbles/mL) was prepared by contacting water and $N_2$ by a fine pore method of a bubble generator (FK-MP-SO 25CW-T1 manufactured by NANOX Co., Ltd.). The silica particle dispersion of Example 5 was obtained by adding 25 g of the second solution to the first solution, and reacting them at 25° C. for 5 hours.

The average particle size of the silica particles in the silica particle dispersion of Example 5 was 5 nm. Further, the silica particle dispersion of Example 5 in which the silica particles and the fine bubbles coexist was filtered through the ultrafiltration membrane (SIP-1013 fractional molecular weight 6000, produced by Asahi Kasei Corporation) to remove the silica particles, and the average bubble diameter and the number of bubbles of the nanobubbles in the filtrate were measured. As a result, they were respectively 294 nm and 100 million bubbles/mL. The processing conditions and the like and each measurement result are shown in Table 1.

Example 6

The solution (first solution) was prepared by adding 0.49 g of tetraethoxysilane to 22 g of denatured ethyl alcohol (AP-11) with stirring. Further, as the bubble aqueous solution which is the second solution, the $N_2$ micro-nano bubble water (average bubble diameter: 79 nm, bubble number: 10 million bubbles/mL) was prepared by contacting water and $N_2$ by the swirl-flow bubble-generator (HYK-20-SD manufactured by Ligaric Co., Ltd.). The silica particle dispersion of Example 6 was obtained by adding 25 g of the second solution to the first solution, and reacting them at 25° C. for 5 hours.

The average particle size of the silica particles in the silica particle dispersion of Example 6 was 6 nm. Further, the silica particle dispersion of Example 6 in which the silica particles and the fine bubbles coexist was filtered through the ultrafiltration membrane (SIP-1013 fractional molecular weight 6000, produced by Asahi Kasei Corporation) to remove the silica particles, and the average bubble diameter and the number of bubbles of the nanobubbles in the filtrate were measured. As a result, they were respectively 82 nm and 8 million bubbles/mL. The processing conditions and the like and each measurement result are shown in Table 1.

Example 7

The solution (first solution) was prepared by adding 0.49 g of tetramethoxysilane to 22 g of denatured ethyl alcohol (AP-11) with stirring. Further, as the bubble aqueous solution which is the second solution, the $N_2$ micro-nano bubble water (average bubble diameter: 79 nm, bubble number: 200 million bubbles/mL) was prepared by contacting water and $N_2$ by the swirl-flow bubble-generator (HYK-20-SD manufactured by Ligaric Co., Ltd.). The silica particle dispersion of Example 7 was obtained by adding 25 g of the second solution to the first solution, and reacting them at 25° C. for 5 hours.

The average particle size of the silica particles in the silica particle dispersion of Example 7 was 5 nm. Further, the silica particle dispersion of Example 7 in which the silica particles and the fine bubbles coexist was filtered through the ultrafiltration membrane (SIP-1013 fractional molecular weight 6000, produced by Asahi Kasei Corporation) to remove the silica particles, and the average bubble diameter and the number of bubbles of the nanobubbles in the filtrate were measured. As a result, they were respectively 80 nm and 180 million bubbles/mL. The processing conditions and the like and each measurement result are shown in Table 1.

Example 8

The solution (first solution) was prepared by adding 0.49 g of tetraethoxysilane to 22 g of denatured ethyl alcohol (AP-11) with stirring. Further, as the bubble aqueous solution which is the second solution, the $N_2$ micro-nano bubble water (average bubble diameter: 79 nm, bubble number: 200 million bubbles/mL) was prepared by contacting water and $N_2$ by the swirl-flow bubble-generator (HYK-20-SD manufactured by Ligaric Co., Ltd.). The silica particle dispersion of Example 8 was obtained by adding 25 g of the second solution to the first solution, and reacting them at 60° C. for 5 hours.

The average particle size of the silica particles in the silica particle dispersion of Example 8 was 5 nm. Further, the silica particle dispersion of Example 8 in which the silica particles and the fine bubbles coexist was filtered through the ultrafiltration membrane (SIP-1013 fractional molecular weight 6000, produced by Asahi Kasei Corporation) to remove the silica particles, and the average bubble diameter and the number of bubbles of the nanobubbles in the filtrate were measured. As a result, they were respectively 81 nm and 170 million bubbles/mL. The processing conditions and the like and each measurement result are shown in Table 1.

Example 9

The solution (first solution) was prepared by adding 0.49 g of tetraethoxysilane to 22 g of denatured ethyl alcohol (AP-11) with stirring. Further, as the bubble aqueous solution which is the second solution, $H_2$ micro-nano bubble water (average bubble diameter: 79 nm, bubble number: 200 million bubbles/mL) was prepared by contacting water and $H_2$ by the swirl-flow bubble-generator (HYK-20-SD manufactured by Ligaric Co., Ltd.). The silica particle dispersion of Example 9 was obtained by adding 25 g of the second solution to the first solution, and reacting them at 25° C. for 5 hours.

The average particle size of the silica particles in the silica particle dispersion of Example 9 was 5 nm. Further, the silica particle dispersion of Example 9 in which the silica particles and the fine bubbles coexist was filtered through the ultrafiltration membrane (SIP-1013 fractional molecular weight 6000, produced by Asahi Kasei Corporation) to remove the silica particles, and the average bubble diameter and the number of bubbles of the nanobubbles in the filtrate were measured. As a result, they were respectively 80 nm and 190 million bubbles/mL. The processing conditions and the like and each measurement result are shown in Table 1.

Example 10

The solution (first solution) was prepared by adding 0.49 g of tetraethoxysilane to 22 g of denatured ethyl alcohol (AP-11) with stirring. Further, as the bubble aqueous solution which is the second solution, the $N_2$ micro-nano bubble water (average bubble diameter: 105 nm, bubble number: 80 million bubbles/mL) was prepared by contacting water and $N_2$ by the swirl-flow bubble-generator (HYK-20-SD manufactured by Ligaric Co., Ltd.). The silica particle dispersion of Example 10 was obtained by adding 25 g of the second solution to the first solution, and reacting them at 25° C. for 5 hours.

The average particle size of the silica particles in the silica particle dispersion of Example 10 was 5 nm. Further, the silica particle dispersion of Example 10 in which the silica particles and the fine bubbles coexist was filtered through the ultrafiltration membrane (SIP-1013 fractional molecular weight 6000, produced by Asahi Kasei Corporation) to remove the silica particles, and the average bubble diameter and the number of bubbles of the nanobubbles in the filtrate were measured. As a result, they were respectively 200 nm and 190 million bubbles/mL. The processing conditions and the like and each measurement result are shown in Table 1.

Example 11

The solution (first solution) was prepared by adding 0.49 g of tetraethoxysilane to 22 g of denatured ethyl alcohol (AP-11) with stirring. Further, as the bubble aqueous solution which is the second solution, the $N_2$ micro-nano bubble water (average bubble diameter: 8000 nm, bubble number: 100 million bubbles/mL) was prepared by contacting water and $N_2$ by the swirl-flow bubble-generator (HYK-20-SD manufactured by Ligaric Co., Ltd.). The silica particle dispersion of Example 11 was obtained by adding 25 g of the second solution to the first solution, and reacting them at 25° C. for 5 hours.

The average particle size of the silica particles in the silica particle dispersion of Example 11 was 5 nm. Further, the silica particle dispersion of Example 11 in which the silica particles and the fine bubbles coexist was filtered through the ultrafiltration membrane (SIP-1013 fractional molecular weight 6000, produced by Asahi Kasei Corporation) to remove the silica particles, and the average bubble diameter and the number of bubbles of the nanobubbles in the filtrate were measured. As a result, they were respectively 8100 nm and 80 million bubbles/mL. The processing conditions and the like and each measurement result are shown in Table 1.

Comparative Example 1

The solution (first solution) was prepared by adding 0.49 g of tetraethoxysilane to 22 g of denatured ethyl alcohol (AP-11) with stirring. Further, ion-exchanged water was used as the second solution. 25 g of the second solution was added to the first solution, and they were reacted at 25° C. for 5 hours. However, no particles were generated.

Comparative Example 2

The solution (first solution) was prepared by adding 0.49 g of tetraethoxysilane to 22 g of denatured ethyl alcohol (AP-11) with stirring. Further, distilled water was used as the second solution. 25 g of the second solution was added to the first solution, and they were reacted at 25° C. for 5 hours. However, no particles were generated.

Comparative Example 3

The solution (first solution) was prepared by adding 0.49 g of tetraethoxysilane to 22 g of denatured ethyl alcohol (AP-11) with stirring. Further, as the bubble aqueous solution which is the second solution, $N_2$ bubble water (average bubble diameter: 12000 nm, bubble number: 10 million bubbles/mL) was prepared by contacting water and $N_2$ by the swirl-flow bubble-generator (HYK-20-SD manufactured by Ligaric Co., Ltd.). 25 g of the second solution was added to the first solution, and they were reacted at 25° C. for 5 hours. However, no particles were generated.

TABLE 1

| Examples and Comparative Examples | Gas type of generating bubbles | First solution | | | Second solution | | | | | Particle generation conditions | | | | Content | | | Ultrafiltration separation | |
|---|---|---|---|---|---|---|---|---|---|---|---|---|---|---|---|---|---|---|
| | | Bubble generation method | Silica raw material and used amount (g) | Organic solvent and used amount (g) | Bubble diameter (nm) | Bubble number (million bubbles/mL) | Bubble water amount (g) | Presence or absence of catalyst | Stirring conditions (rpm) | Reaction temperature °C. | Reaction time (Hrs) | Generated particle size by TEM (nm) | Na/silica in silica particle (ppm) | Content of impurity[note 1]/silica (ppm) | Nitrogen compound as NH$_x$/silica (ppm) | Bubble diameter in filtrated (nm) | Bubble number in filtrated (million bubbles/mL) |
| Example 1 | O$_2$ | Swirling flow method | TEOS 0.49 | Denatured ethanol 22 | 70 | 2.4 | 25 | No | 350 | 25 | 5 | 5 | Less than 1 | Less than 10 | Less than 1 | 75 | 1.5 |
| Example 2 | N$_2$ | Swirling flow method | TEOS 0.49 | Denatured ethanol 22 | 79 | 2.0 | 25 | No | 350 | 25 | 5 | 5 | Less than 1 | Less than 10 | Less than 1 | 80 | 1.4 |
| Example 3 | O$_3$ | Swirling flow method | TEOS 0.49 | Denatured ethanol 22 | 65 | 1.6 | 25 | No | 350 | 25 | 5 | 5 | Less than 1 | Less than 10 | Less than 1 | 70 | 1.5 |
| Example 4 | Ar | Swirling flow method | TEOS 0.49 | Denatured ethanol 22 | 75 | 1.6 | 25 | No | 350 | 25 | 5 | 5 | Less than 1 | Less than 10 | Less than 1 | 77 | 1.4 |
| Example 5 | N$_2$ | Fine pore method | TEOS 0.49 | Denatured ethanol 22 | 291 | 1.1 | 25 | No | 350 | 25 | 5 | 5 | Less than 1 | Less than 10 | Less than 1 | 294 | 1.0 |
| Example 6 | N$_2$ | Swirling flow method | TEOS 0.49 | Denatured ethanol 22 | 79 | 0.1 | 25 | No | 350 | 25 | 5 | 6 | Less than 1 | Less than 10 | Less than 1 | 82 | 0.08 |
| Example 7 | N$_2$ | Swirling flow method | TMOS 0.49 | Denatured ethanol 22 | 79 | 2.0 | 25 | No | 350 | 25 | 5 | 5 | Less than 1 | Less than 10 | Less than 1 | 80 | 1.8 |
| Example 8 | N$_2$ | Swirling flow method | TEOS 0.49 | Denatured ethanol 22 | 79 | 2.0 | 25 | No | 350 | 60 | 5 | 5 | Less than 1 | Less than 10 | Less than 1 | 81 | 1.7 |
| Example 9 | H$_2$ | Swirling flow method | TEOS 0.49 | Denatured ethanol 22 | 79 | 2.0 | 25 | No | 350 | 25 | 5 | 5 | Less than 1 | Less than 10 | Less than 1 | 80 | 1.9 |
| Example 10 | N$_2$ | Swirling flow method | TEOS 0.49 | Denatured ethanol 22 | 105 | 80 | 25 | No | 350 | 25 | 5 | 5 | Less than 1 | Less than 10 | Less than 1 | 200 | 1.9 |
| Example 11 | N$_2$ | Swirling flow method | TEOS 0.49 | Denatured ethanol 22 | 8000 | 1.0 | 25 | No | 350 | 25 | 5 | 5 | Less than 1 | Less than 10 | Less than 1 | 8100 | 0.8 |
| Comparative Example 1 | — | — | TEOS 0.49 | Denatured ethanol 22 | — | — | 25 (Ion-exchanged water) | No | 350 | 25 | 5 | No particle generation | — | — | — | — | — |

TABLE 1-continued

| Examples and Comparative Examples | Gas type of generating bubbles | First solution | | | Second solution | | | | | Particle generation conditions | | | | Content of | | | Ultrafiltration separation | |
|---|---|---|---|---|---|---|---|---|---|---|---|---|---|---|---|---|---|---|
| | | Bubble generation method | Silica raw material and used amount (g) | Organic solvent and used amount (g) | Bubble diameter (nm) | Bubble number (million bubbles/mL) | Bubble water amount (g) | Presence or absence of catalyst | Stirring conditions (rpm) | Reaction temperature °C | Reaction time (Hrs) | Generated particle size by TEM (nm) | Na/silica in silica particle (ppm) | Content of impurity[note 1]/silica (ppm) | Nitrogen compound as NH$_x$/silica (ppm) | Bubble diameter in filtrated (nm) | Bubble number in filtrated (million bubbles/mL) |
| Comparative Example 2 | — | — | TEOS 0.49 | Denatured ethanol 22 | — | — | 25 (Distilled water) | No | 350 | 25 | 5 | No particle generation | — | — | — | — | — |
| Comparative Example 3 | N$_2$ | Swirling flow method | TEOS 0.49 | Denatured ethanol 22 | 12000 | 0.1 | 25 | No | 350 | 25 | 5 | No particle generation | — | — | — | — | — |

Impurity of [note 1] indicates each of Al, Ca, Mg, Ti, K, Zn, Pb, Cr, Fe, Mn, Ag, Cu and Ni.

As shown in Table 1, it was confirmed that silica fine particles of about 5 nm are produced by hydrolyzing the silane alkoxide such as tetramethylalkoxysilane and tetraethylalkoxysilane using the fine bubbles (micro-nano bubbles).

Example 12

<Fine Particle Preparation Step>

The solution (first solution) was prepared by adding 19.4 g of tetraethoxysilane to 814 g of denatured ethyl alcohol (AP-11) with stirring. Further, as the bubble aqueous solution which is the second solution, the $O_2$ micro-nano bubble water (average bubble diameter: 121 nm, bubble number: 169 million bubbles/mL) was prepared by contacting water and $O_2$ by the swirl-flow bubble-generator (HYK-20-SD manufactured by Ligaric Co., Ltd.). The silica particle dispersion (liquid A) was obtained by adding 971 g of the second solution to the first solution, and reacting them at 25° C. for 5 hours. Note that the $O_2$ micro-nano bubble water used in the following examples was the same as the second solution in this example.

The liquid A was concentrated to 375 g using a rotary evaporator (RE device). This solution was added with 450 g of pure water and concentrated with the RE device to obtain 300 g of a concentrated solution. An aqueous dispersion was obtained by repeating this operation of adding pure water and concentrating with the RE device twice (water solvent replacement step). Thereafter, the pH was adjusted to 9.3 using 3 mass % ammonia water and pure water to obtain the silica particle dispersion (liquid B) dispersed in water with a silica concentration of 1 mass %. The average particle size of the silica particles in the liquid B was 5 nm. Details are shown in Table 2 (the same below).

<Particle Growth Step>

The seed solution was obtained by collecting 100 g of the liquid B prepared in the fine particle preparation step and mixing it with 200 g of pure water. On the other hand, a silicic acid solution obtained by cation exchange of No. 3 water glass having a silica concentration of 2.5 mass % was cation-exchanged again to prepare the silicic acid solution (additive substance I) having a silica concentration of 2.3 mass %.

As seeding, the seed solution was heated to 80° C. with stirring and held for 0.5 hours. Subsequently, while controlling the pH of the seed solution to 9.0 by adding 3 mass % ammonia solution to the seed solution, 1080 g of the silicic acid solution (additive substance I) derived from the water glass adjusted to 10° C. was added to the seed solution at a rate of 3.6 g/min. Thus, the silica-based particle dispersion was obtained. This was concentrated (organic solvent removal step) with the RE device, and adjusted to have pH 9 with 3 mass % ammonia water. The concentration of the produced silica-based particle dispersion was 10 mass % in terms of $SiO_2$. Further, the average particle size of the silica-based particles was 12.5 nm, the standard deviation was 3.1 nm, and the CV value was 0.25. The details are shown in Table 2 (the same below).

Note that the standard deviation and the CV value were calculated from the average particle size measured according to the method for measuring the silica particles in Example 1 (the same below).

Example 13

The seed solution was obtained by collecting 100 g of the liquid B prepared in the same manner as in Example 12 and mixing it with 200 g of pure water. On the other hand, a silica solution (additive substance I) having the silica concentration of 2.3 mass % was prepared by adding 63 g of tetramethoxysilane to 1017 g of the $O_2$ micro-nano bubble water.

As seeding, the seed solution was heated to 80° C. with stirring and held for 0.5 hours. Subsequently, while controlling the pH of the seed solution to 9.0 by adding 3 mass % ammonia solution to the seed solution, 1080 g of the silica solution (additive substance I) derived from the tetramethoxysilane adjusted to 10° C. was added to the seed solution at the rate of 3.6 g/min. Thus, the silica-based particle dispersion was obtained. This was concentrated with the RE device, and adjusted to have pH 9 with 3 mass % ammonia water. The concentration of the produced silica-based particle dispersion was 10 mass % in terms of $SiO_2$. Further, the average particle size of the silica-based particles was 23.0 nm, the standard deviation was 4.6 nm, and the CV value was 0.20.

Example 14

The seed solution was obtained by collecting 100 g of the liquid B prepared in the same manner as in Example 12 and mixing it with 2.8 g of 25 mass % TMAH solution and 197.2 g of pure water. The pH of the solution at this time was 12. On the other hand, the silica solution (additive substance I) having the silica concentration of 2.3 mass % was prepared by adding 63 g of tetramethoxysilane to 1017 g of the $O_2$ micro-nano bubble water.

As seeding, the seed solution was heated to 80° C. with stirring and held for 0.5 hours. Subsequently, 1080 g of the silica solution (additive substance I) derived from the tetramethoxysilane adjusted to 10° C. was added to the seed solution at the rate of 3.6 g/min. Thus, the silica-based particle dispersion was obtained. This was concentrated with the RE device, and adjusted to have pH 9 with 3 mass % ammonia water. The concentration of the produced silica-based particle dispersion was 10 mass % in terms of $SiO_2$. Further, the average particle size of the silica-based particles was 19.5 nm, the standard deviation was 5.1 nm, and the CV value was 0.26.

Example 15

In the fine particle preparation step, the seed solution was obtained by collecting 30 g of silica sol obtained in Example 13 and mixing it with 270 g of the $O_2$ micro-nano bubble water. On the other hand, the silica solution (additive substance I) having the silica concentration of 2.3 mass % was prepared by adding 63 g of tetramethoxysilane to 1017 g of the $O_2$ micro-nano bubble water.

As seeding, the seed solution was heated to 80° C. with stirring and held for 0.5 hours. Subsequently, while controlling the pH of the seed solution to 9.0 by adding 3 mass % ammonia solution to the seed solution, 1080 g of the silica solution (additive substance I) derived from the tetramethoxysilane adjusted to 10° C. was added to the seed solution at the rate of 3.6 g/min. Thus, the silica-based particle dispersion was obtained. This was concentrated with the RE device, and adjusted to have pH 9 with 3 mass % ammonia water. The concentration of the produced silica-based particle dispersion was 10 mass % in terms of $SiO_2$. Further, the average particle size of the silica-based particles was 46.2 nm, the standard deviation was 6.9 nm, and the CV value was 0.15.

Example 16

In the fine particle preparation step, the seed solution was obtained by collecting 30 g of silica-based particle dispersion obtained in Example 15 and mixing it with 270 g of the $O_2$ micro-nano bubble water. On the other hand, the silica solution (additive substance I) having the silica concentration of 2.3 mass % was prepared by adding 63 g of tetramethoxysilane to 1017 g of the $O_2$ micro-nano bubble water.

As seeding, the seed solution was heated to 90° C. with stirring and held for 0.5 hours. Subsequently, while controlling the pH of the seed solution to 9.0 by adding 3 mass % ammonia solution to the seed solution, 1080 g of the silica solution (additive substance I) derived from the tetramethoxysilane adjusted to 10° C. was added to the seed solution at the rate of 1.8 g/min. Thus, the silica-based particle dispersion was obtained. This was concentrated with the RE device, and adjusted to have pH 9 with 3 mass % ammonia water. The concentration of the produced silica-based particle dispersion was 10 mass % in terms of $SiO_2$. Further, the average particle size of the silica-based particles was 92 nm, the standard deviation was 12.9 nm, and the CV value was 0.14.

Example 17

In the fine particle preparation step, the seed solution was obtained by collecting 30 g of silica-based particle dispersion obtained in Example 16 and mixing it with 270 g of the $O_2$ micro-nano bubble water. On the other hand, the silica solution (additive substance I) having the silica concentration of 2.3 mass % was prepared by adding 63 g of tetramethoxysilane to 1017 g of the $O_2$ micro-nano bubble water.

As seeding, the seed solution was heated to 120° C. with stirring and held for 0.5 hours. Subsequently, while controlling the pH of the seed solution to 9.0 by adding 3 mass % ammonia solution to the seed solution, 1080 g of the silica solution (additive substance I) derived from the tetramethoxysilane adjusted to 10° C. was added to the seed solution at the rate of 1.2 g/min. Thus, the silica-based particle dispersion was obtained. This was concentrated with the RE device, and adjusted to have pH 9 with 3 mass % ammonia water. The concentration of the produced silica-based particle dispersion was 10 mass % in terms of $SiO_2$. Further, the average particle size of the silica-based particles was 180 nm, the standard deviation was 21.6 nm, and the CV value was 0.12.

Example 18

The seed solution was obtained by collecting 100 g of the liquid B prepared in the same manner as in Example 12 and mixing it with 200 g of pure water. On the other hand, the silica solution (additive substance I) having the silica concentration of 2.3 mass % was prepared by adding 63 g of tetramethoxysilane to 1017 g of pure water. Further, 5 mass % zirconia solution (additive substance II) in terms of $ZrO_2$ was prepared by diluting a solution of tetraisopropoxy zirconium (ZA-40 produced by Matsumoto Fine Chemical Co., Ltd.) with ethyl alcohol.

As seeding, the seed solution was heated to 80° C. with stirring and held for 0.5 hours. Subsequently, while controlling the pH of the seed solution to 9.0 by adding 3 mass % ammonia solution to the seed solution, 1080 g of the silica solution (additive substance I) derived from the tetramethoxysilane adjusted to 10° C. was added to the seed solution at the rate of 3.6 g/min. At the same time, 20 g of the zirconia solution (additive substance II) was added to the seed solution at 0.07 g/min. Thus, the silica-based particle dispersion of composite oxide of silica and zirconia was obtained. This was concentrated with the RE device, and adjusted to have pH 9 with 3 mass % ammonia water. The concentration of the produced silica-based particle dispersion was 10 mass % in terms of $SiO_2$—$ZrO_2$. Further, the average particle size of the silica-based particles was 24.5 nm, the standard deviation was 4.9 nm, and the CV value was 0.20.

Example 19

The seed solution was obtained by collecting 100 g of the liquid B prepared in the same manner as in Example 12 and mixing it with 200 g of pure water. On the other hand, the silica solution (additive substance I) having the silica concentration of 2.3 mass % was prepared by adding 63 g of tetramethoxysilane to 1017 g of pure water. Further, 5 mass % titania solution (additive substance II) in terms of $TiO_2$ was prepared by diluting a solution of tetraisopropoxy titanium (TA-10 produced by Matsumoto Fine Chemical Co., Ltd.) with ethyl alcohol.

As seeding, the seed solution was heated to 80° C. with stirring and held for 0.5 hours. Subsequently, while controlling the pH of the seed solution to 9.0 by adding 3 mass % ammonia solution to the seed solution, 1080 g of the silica solution (additive substance I) derived from the tetramethoxysilane adjusted to 10° C. was added to the seed solution at the rate of 3.6 g/min. At the same time, 20 g of the titania solution (additive substance II) was added to the seed solution at 0.07 g/min. Thus, the silica-based particle dispersion of composite oxide of silica and titania was obtained. This was concentrated with the RE device, and adjusted to have pH 9 with 3 mass % ammonia water. The concentration of the produced silica-based particle dispersion was 10 mass % in terms of $SiO_2$—$TiO_2$. Further, the average particle size of the silica-based particles was 25.3 nm, the standard deviation was 6.0 nm, and the CV value was 0.24. The details are shown in Table 3 (the same below).

Example 20

The seed solution was obtained by collecting 100 g of liquid C, which was prepared in the same manner as in Example 12 except that the $N_2$ micro-nano bubble water was used instead of the $O_2$ micro-nano bubble water, and by mixing it with 200 g of the $N_2$ micro-nano bubble water. On the other hand, the silica solution (additive substance I) having the silica concentration of 2.3 mass % was prepared by adding 63 g of tetramethoxysilane to 1017 g of the $N_2$ micro-nano bubble water. Further, 5 mass % alumina solution (additive substance II) in terms of $Al_2O_3$ was prepared by diluting a solution of triisopropoxy aluminum (produced by Tokyo Chemical Industry Co., Ltd.) with ethyl alcohol.

As seeding, the seed solution was heated to 80° C. with stirring and held for 0.5 hours. Subsequently, while controlling the pH of the seed solution to 9.0 by adding 3 mass % ammonia solution to the seed solution, 1080 g of the silica solution (additive substance I) derived from the tetramethoxysilane adjusted to 10° C. was added to the seed solution at the rate of 3.6 g/min. At the same time, 20 g of the alumina solution (additive substance II) was added to the seed solution at 0.07 g/min. Thus, the silica-based particle dispersion of composite oxide of silica and alumina was obtained. This was concentrated with the RE device, and adjusted to have pH 9 with 3 mass % ammonia water. The concentration of the produced silica-based particle dispersion was 10 mass % in terms of $SiO_2$—$Al_2O_3$. Further, the average particle size of the silica-based particles was 24.0 nm, the standard deviation was 4.3 nm, and the CV value was 0.18.

Example 21

The seed solution was obtained by collecting 100 g of the liquid B prepared in the same manner as in Example 12 and mixing it with 200 g of pure water.

On the other hand, a solution (third solution) was prepared by adding 97 g of tetraethoxysilane to 4070 g of denatured ethyl alcohol (AP-11) as for the particle growth with stirring. Next, 4855 g of the $O_2$ micro-nano bubble water (second solution) prepared in the same manner as in Example 12 was added to the third solution, and reacted at 25° C. for 5 hours to obtain the silica particle dispersion. The silica particle dispersion was concentrated to 1860 g using the RE device. This solution was added with 2000 g of pure water and concentrated with the RE device to obtain 1860 g of the concentrated solution. The aqueous dispersion was obtained by repeating this operation of adding pure water and concentrating with the RE device twice. The aqueous dispersion was concentrated to 600 g using the RE device to obtain a liquid D. The silica solution (additive substance I) having the silica concentration of 2.3 mass % was prepared by adding 480 g of the $O_2$ micro-nano bubble water to the liquid D.

As seeding, the seed solution was heated to 80° C. with stirring and held for 0.5 hours. Subsequently, while controlling the pH of the seed solution to 9.0 by adding 3 mass % ammonia solution to the seed solution, 1080 g of the silica solution (additive substance I) derived from the tetraethoxysilane adjusted to 10° C. was added to the seed solution at the rate of 7.2 g/min. Thus, the silica-based particle dispersion was obtained. This was concentrated with the RE device, and adjusted to have pH 9 with 3 mass % ammonia water. The concentration of the produced silica-based particle dispersion was 10 mass % in terms of $SiO_2$. Further, the average particle size of the silica-based particles was 22.0 nm, the standard deviation was 4.6 nm, and the CV value was 0.21.

Example 22

<Fine Particle Preparation Step>

The solution (first solution) was prepared by adding 14.2 g of tetramethoxysilane to 819.2 g of denatured ethyl alcohol (AP-11) with stirring. 971 g of $O_2$ micro-nano bubble water (second solution) prepared in the same manner as in Example 12 was added to the first solution and reacted at 25° C. for 5 hours to obtain the silica particle dispersion (liquid E).

The liquid E was concentrated to 375 g using the RE device. This solution was added with 450 g of pure water and concentrated with the RE device to obtain 300 g of the concentrated solution. The aqueous dispersion was obtained by repeating this operation of adding pure water and concentrating with the RE device twice. Thereafter, the pH was adjusted to 9.3 using 3 mass % ammonia water and pure water to obtain the silica particle dispersion (liquid F) dispersed in water with the silica concentration of 1 mass %. The average particle size of the silica particles in the liquid F was 5 nm.

<Particle Growth Step>

The seed solution was obtained by collecting 100 g of the liquid F prepared in the fine particle preparation step and mixing it with 200 g of pure water. On the other hand, the silica solution (additive substance I) having the silica concentration of 2.3 mass % was prepared by adding 63 g of tetramethoxysilane to 1017 g of the $O_2$ micro-nano bubble water.

As seeding, the seed solution was heated to 80° C. with stirring and held for 0.5 hours. Subsequently, while controlling the pH of the seed solution to 9.0 by adding 3 mass % ammonia solution to the seed solution, 1080 g of the silica solution (additive substance I) derived from the tetramethoxysilane adjusted to 10° C. was added to the seed solution at the rate of 3.6 g/min. Thus, the silica-based particle dispersion was obtained. This was concentrated with the RE device, and adjusted to have pH 9 with 3 mass % ammonia water. The concentration of the produced silica-based particle dispersion was 10 mass % in terms of $SiO_2$. Further, the average particle size of the silica-based particles was 21.5 nm, the standard deviation was 4.1 nm, and the CV value was 0.19.

Example 23

The liquid E prepared in the same manner as in Example 22 was concentrated to 375 g using the RE device. This solution was added with 450 g of pure water and concentrated with the RE device to obtain 300 g of the concentrated solution. The aqueous dispersion was obtained by repeating this operation of adding pure water and concentrating with the RE device twice. Thereafter, the pH was adjusted to 7.0 using 3 mass % ammonia water and pure water to obtain the silica particle dispersion (liquid G) dispersed in water with the silica concentration of 0.33 mass %. The average particle size of the silica particles in the liquid G was 5 nm.

<Particle Growth Step>

The seed solution was obtained by collecting 300 g of the liquid G prepared in the fine particle preparation step. On the other hand, the silica solution (additive substance I) having the silica concentration of 2.3 mass % was prepared by adding 63 g of tetramethoxysilane to 1017 g of the $O_2$ micro-nano bubble water.

As seeding, the seed solution was kept at pH 7.0 and 25° C. for 0.5 hours with stirring. Subsequently, while simultaneously adding 3 mass % ammonia solution and the silica solution (additive substance I) derived from the tetramethoxysilane adjusted to 10° C. to the seed solution, the pH of a reaction solution was adjusted to 9.0, and the temperature was adjusted to 80° C. After the pH of the reaction solution has reached 9.0 and the temperature has reached 80° C., while the pH and the temperature are controlled to be constant, both solutions were added to obtain the silica-based particle dispersion. Note that 1080 g of the silica solution (additive substance I) was added at the rate of 3.6 g/min. The obtained silica-based particle dispersion was concentrated with the RE device, and adjusted to have pH 9 with 3 mass % ammonia water. The concentration of the produced silica-based particle dispersion was 10 mass % in terms of $SiO_2$. Further, the average particle size of the silica-based particles was 22.0 nm, the standard deviation was 4.6 nm, and the CV value was 0.21.

Comparative Example 4

<Fine Particle Preparation Step>

The solution (first solution) was prepared by adding 19.4 g of tetraethoxysilane to 814 g of denatured ethyl alcohol (AP-11) with stirring. Further, 971 g of pure water, which is the second solution, was added to the first solution and reacted at 25° C. for 5 hours to obtain the liquid A. No particles were generated in the liquid A.

The liquid A was concentrated to 375 g using the RE device. This solution was added with 450 g of pure water and concentrated with the RE device to obtain 300 g of the concentrated solution. The aqueous dispersion was obtained by repeating this operation of adding pure water and concentrating with the RE device twice. Thereafter, the pH was adjusted to 9.3 using 3 mass % ammonia water and pure water to obtain a dispersion (liquid H) dispersed in water with the silica concentration of 1 mass %. The silica particles in the liquid H were not detected. The details are shown in Table 3 (the same below).

<Particle Growth Step>

The seed solution (but without particles) was obtained by collecting 100 g of the liquid H prepared in the fine particle preparation step and mixing it with 200 g of pure water. On the other hand, the silicic acid solution obtained by cation exchange of No. 3 water glass having the silica concentration of 2.5 mass % was cation-exchanged again to prepare the silicic acid solution (additive substance I) having the silica concentration of 2.3 mass %.

As seeding, the seed solution was heated to 80° C. with stirring and held for 0.5 hours. Subsequently, while controlling the pH of the solution to 9.0 by adding 3 mass % ammonia solution to the solution, 1080 g of the silicic acid solution (additive substance I) derived from the water glass adjusted to 10° C. was added to the solution at the rate of 3.6 g/min. Thus, the silica-based particle dispersion was obtained. This was concentrated with the RE device, and adjusted to have pH 9 with 3 mass % ammonia water. The concentration of the produced silica-based particle dispersion was 10 mass % in terms of $SiO_2$. Further, the average particle size of the silica-based particles was 14 nm, the standard deviation was 4.9 nm, and the CV value was 0.35, and the particle size distribution was wide. The details are shown in Table 3 (the same below).

Comparative Example 5

<Fine Particle Preparation Step>

The solution (first solution) was prepared by adding 19.4 g of tetraethoxysilane to 814 g of denatured ethyl alcohol (AP-11) with stirring. Further, a mixed solution of 971 g of pure water and 10 g of 15 mass % ammonia water, which is the second solution, was added to the first solution and reacted at 25° C. for 5 hours to obtain the silica particle dispersion (liquid A).

The liquid A was concentrated to 375 g using the RE device. This solution was added with 450 g of water and concentrated with the RE device to obtain 300 g of the concentrated solution. The aqueous dispersion was obtained by repeating this operation of adding pure water and concentrating with the RE device twice.

Thereafter, the pH was adjusted to 9.3 using 3 mass % ammonia water and pure water to obtain a dispersion (liquid J) dispersed in water with the silica concentration of 1 mass %. The average particle size of the silica particles in the liquid J was 250 nm.

<Particle Growth Step>

The seed solution was obtained by collecting 100 g of the liquid J prepared in the fine particle preparation step and mixing it with 200 g of pure water. On the other hand, the silica solution (additive substance I) having the silica concentration of 2.3 mass % was prepared by adding 63 g of tetramethoxysilane to 1017 g of pure water.

As seeding, the seed solution was heated to 120° C. with stirring and held for 0.5 hours. Subsequently, while controlling the pH of the solution to 9.0 by adding 3 mass % ammonia solution, 1080 g of the silica solution (additive substance I) derived from the tetramethoxysilane adjusted to 10° C. was added to the seed solution at the rate of 1.2 g/min. Thus, the silica based particle dispersion was obtained. This was concentrated with the RE device, and adjusted to have pH 9 with 3 mass % ammonia water. The concentration of the produced silica-based particle dispersion was 10 mass % in terms of $SiO_2$. Further, the average particle size of the silica-based particles was 310 nm, the standard deviation was 65.1 nm, and the CV value was 0.21, and the particle size distribution was wide.

TABLE 2

| | | | Example 12 | Example 13 | Example 14 | Example 15 | Example 16 | Example 17 | Example 18 |
|---|---|---|---|---|---|---|---|---|---|
| Seed (seed particle) preparation step | First solution: | Liquid A: Silica raw material | TEOS | TEOS | TEOS | — | — | — | TEOS |
| | | Organic solvent | Denatured ethanol | Denatured ethanol | Denatured ethanol | — | — | — | Denatured ethanol |
| | Second solution: | Bubble for bubble generation | $O_2$ | $O_2$ | $O_2$ | — | — | — | $O_2$ |
| | | Average bubble diameter of used bubble water (nm) | 121 | 121 | 121 | — | — | — | 121 |
| | | Total number of bubbles of used bubble water (100 million bubbles/ml) | 1.69 | 1.69 | 1.69 | — | — | — | 1.69 |
| | Particle generation conditions: | Stirring conditions (rpm) | 350 | 350 | 350 | — | — | — | 350 |
| | | Reaction temperature (°C.) | 25 | 25 | 25 | — | — | — | 25 |
| | | Reaction time (hrs.) | 5 | 5 | 5 | — | — | — | 5 |
| | | Presence or absence of catalyst | No | No | No | — | — | — | No |
| | | Content of Na in particle/silica (ppm) | Less than 1 | Less than 1 | Less than 1 | — | — | — | Less than 1 |
| | | Content of impurity*1/silica (ppm) | Less than 10 | Less than 10 | Less than 10 | — | — | — | Less than 10 |
| | | Nitrogen compound as $NH_x$/silica (ppm) | Less than 1 | Less than 1 | Less than 1 | — | — | — | Less than 1 |
| | | Average particle size by TEM (nm) | 122 | 124 | 123 | — | — | — | 125 |
| | | Average bubble number (100 million bubbles/ml) | 1.60 | 1.58 | 1.61 | — | — | — | 1.58 |
| | Liquid B (seed): | Solvent | Pure water | Pure water | Pure water | — | — | — | Pure water |
| | | Silica concentration (mass %) | 1 | 1 | 1 | — | — | — | 1 |
| | | pH | 9.3 | 9.3 | 9.3 | — | — | — | 9.3 |
| | | Average particle size by TEM (nm) | 5 | 5 | 5 | — | — | — | 5 |
| | | Average bubble diameter (nm) | 110 | 111 | 110 | — | — | — | 115 |
| | | Average bubble number (100 million bubbles/ml) | 1.3 | 1.3 | 1.3 | — | — | — | 1.3 |
| Particle growth step | Seed solution: | | Liquid B | Liquid B | Liquid B | Example 13 product | Example 15 product | Example 16 product | Liquid B |
| | Solvent | | Pure water | Pure water | Pure water | Nanobubble water ($O_2$) | Nanobubble water ($O_2$) | Nanobubble water ($O_2$) | Pure water |
| | Seeding operation | | Yes | Yes | Yes | Yes | Yes | Yes | Yes |
| | Additive substance I | Silica raw material | Silicic acid solution | TMOS | TMOS | TMOS | TMOS | TMOS | TMOS |
| | | Metal oxide concentration (mass %) | 2.3 (as $SiO_2$) | 2.3 (as $SiO_2$) | 2.3 (as $SiO_2$) | 2.3 (as $SiO_2$) | 2.3 (as $SiO_2$) | 2.3 (as $SiO_2$) | 2.3 (as $SiO_2$) |
| | | Dilution water | Pure water | Nanobubble water ($O_2$) | Nanobubble water ($O_2$) | Nanobubble water ($O_2$) | Nanobubble water ($O_2$) | Nanobubble water ($O_2$) | Pure water |
| | | Average bubble diameter of used bubble water (nm) | — | 121 | 121 | 121 | 121 | 121 | — |
| | | Total number of bubbles of used bubble water (100 million bubbles/ml) | — | 1.69 | 1.69 | 1.69 | 1.69 | 1.69 | — |

TABLE 2-continued

|  |  |  | Example 12 | Example 13 | Example 14 | Example 15 | Example 16 | Example 17 | Example 18 |
|---|---|---|---|---|---|---|---|---|---|
| Additive substance II | Metal oxide raw material |  | — | — | — | — | — | — | Zr(OPr)$_4$ |
|  | Dilution solvent |  | — | — | — | — | — | — | Ethanol |
|  | Metal oxide concentration | (mass %) | — | — | — | — | — | — | 5 (as ZrO$_2$) |
| Particle growth reaction conditions | Reaction temperature | (° C.) | 80 | 80 | 80 | 80 | 90 | 120 | 80 |
|  | Reaction time | (hrs.) | 5 | 5 | 5 | 5 | 10 | 15 | 5 |
|  | Alkaline catalyst |  | 3% ammonia water | 3% ammonia water | 25% TMAH | 3% ammonia water | 3% ammonia water | 3% ammonia water | 3% ammonia water |
|  | pH |  | 9.0 | 9.0 | 12 (outcome) | 9.0 | 9.0 | 9.0 | 9.0 |
|  | Presence or absence of organic solvent removal step |  | Yes | Yes | Yes | Yes | Yes | Yes | Yes |
| Product | Dispersion medium |  | Water | Water | Water | Water | Water | Water | Water |
|  | Metal oxide |  | Silica | Silica | Silica | Silica | Silica | Silica | Silica-Zirconia |
|  | Metal oxide concentration | (mass %) | 10 | 10 | 10 | 10 | 10 | 10 | 10 (SiO$_2$/ZrO$_2$ = 96.8/3.2) |
|  | Content of Na in particle/metal oxide | (ppm) | Less than 1 | Less than 1 | Less than 1 | Less than 1 | Less than 1 | Less than 1 | Less than 1 |
|  | Content of impurity*$^1$/metal oxide | (ppm) | Less than 10 | Less than 10 | Less than 10 | Less than 10 | Less than 10 | Less than 10 | Less than 10 |
|  | pH |  | 9 | 9 | 9 | 9 | 9 | 9 | 9 |
|  | Average particle size by TEM | (nm) | 12.5 | 23.0 | 19.5 | 46.2 | 92.0 | 180.0 | 24.5 |
|  | Standard deviation | (nm) | 3.1 | 4.6 | 5.1 | 6.9 | 12.9 | 21.6 | 4.9 |
|  | CV value |  | 0.25 | 0.20 | 0.26 | 0.15 | 0.14 | 0.12 | 0.20 |
|  | Average bubble diameter | (nm) | 70 | 80 | 114 | 86 | 91 | 97 | 115 |
|  | Total number of bubbles | (100 million bubbles/ml) | 0.3 | 1.5 | 1.1 | 1.4 | 0.90 | 0.71 | 1.08 |

Impurity of *$^1$ indicates each of alkali metal, alkaline earth metal, Zn, Pb, Ag, Mn, Co, Mo, Cu, Ni, Cr, U and Th.

TABLE 3

|  |  |  |  | Example 19 | Example 20 | Example 21 | Example 22 | Example 23 | Comparative Example 4 | Comparative Example 5 |
|---|---|---|---|---|---|---|---|---|---|---|
| Seed (seed particle) preparation step | First solution: | Liquid A: Silica raw material Organic solvent |  | TEOS Denatured ethanol | TEOS Denatured ethanol | TEOS Denatured ethanol | TMOS Denatured ethanol | TMOS Denatured ethanol | TEOS Denatured ethanol | TEOS Denatured ethanol |
|  | Second solution: | Bubble for bubble generation Average bubble diameter of used bubble water Total number of bubbles of used bubble water | (nm) (100 million bubbles/ml) | $O_2$ 121 1.69 | $N_2$ 81 1.75 | $O_2$ 121 1.69 | $O_2$ 121 1.69 | $O_2$ 121 1.69 | — — — | — — — |
|  | Particle generation conditions: | Stirring conditions Reaction temperature Reaction time Presence or absence of catalyst | (rpm) (°C.) (hrs.) | 350 25 5 No | 350 25 5 No | 350 25 5 No | 350 25 5 No | 350 25 5 No | 350 25 5 No | 350 25 5 Yes ($NH_3$) |
|  |  | Content of Na in particle/silica Content of impurity*1/silica Nitrogen compound as $NH_x$/silica Average bubble diameter Average bubble number | (ppm) (ppm) (ppm) (nm) (100 million bubbles/ml) | Less than 1 Less than 10 Less than 1 122 1.60 | Less than 1 Less than 10 Less than 1 85 1.73 | Less than 1 Less than 10 Less than 1 122 1.60 | Less than 1 Less than 10 Less than 1 124 1.58 | Less than 1 Less than 10 Less than 1 124 1.58 | — — — No particle generation | Less than 1 Less than 10 Less than 1 — — |
| Particle growth step | Seed solution: | Liquid B (seed): Solvent Silica concentration pH Average particle size by TEM Average bubble diameter Average bubble number | (mass %) (nm) (nm) (100 million bubbles/ml) | Pure water 1 9.3 5 110 1.3 | Pure water 1 9.3 5 75 1.4 | Pure water 1 9.3 5 110 1.3 | Pure water 1 9.3 5 111 1.3 | Pure water 0.33 7 5 111 1.3 | — — — — — — | Pure water 1 9.3 250 — — |
|  | Seeding operation | Seed solution: Solvent |  | Liquid B Pure water | Liquid C Nanobubble water ($N_2$) | Liquid B Pure water | Liquid F Pure water | Liquid G Pure water | Liquid H Pure water | Liquid J Pure water |
|  | Additive | Seeding operation Silica raw material Metal oxide concentration Dilution water | (mass %) | Yes TMOS 2.3 (as $SiO_2$) Pure water | Yes TMOS 2.3 (as $SiO_2$) Nanobubble water ($N_2$) | Yes Liquid D 2.3 (as $SiO_2$) Nanobubble water ($O_2$) | Yes TMOS 2.3 (as $SiO_2$) Nanobubble water ($O_2$) | Yes TMOS 2.3 (as $SiO_2$) Nanobubble water ($O_2$) | Yes Silicic acid solution 2.3 (as $SiO_2$) Pure water | Yes TMOS 2.3 (as $SiO_2$) Pure water |
|  |  | Average bubble diameter of used bubble water Total number of bubbles of used bubble water | (nm) (100 million bubbles/ml) | — — | 81 1.75 | 121 1.69 | 121 1.69 | 121 1.69 | — — | — — |
|  | Additive substance II | Metal oxide raw material Dilution solvent |  | $Ti(OPr)_4$ Ethanol | $Al(OPr)_3$ Ethanol | — — | — — | — — | — — | — — |

TABLE 3-continued

| | | | Example 19 | Example 20 | Example 21 | Example 22 | Example 23 | Comparative Example 4 | Comparative Example 5 |
|---|---|---|---|---|---|---|---|---|---|
| Particle growth reaction conditions | Metal oxide concentration | (mass %) | 5(as TiO$_2$) | 5(as Al$_2$O$_3$) | — | — | — | — | — |
| | Reaction temperature | (° C.) | 80 | 80 | 80 | 80 | 25 —-> 80 | 80 | 120 |
| | Reaction time | (hrs.) | 5 | 5 | 5 | 5 | 5 | 5 | 15 |
| | Alkaline catalyst | | 3% ammonia water | 3% ammonia water | 3% ammonia water | 3% ammonia water | 3% ammonia water | 3% ammonia water | 3% ammonia water |
| | pH | | 9.0 | 9.0 | 9.0 | 9.0 | 9.0 | 9.0 | 9.0 |
| | Presence or absence of organic solvent removal step | | Yes | Yes | Yes | Yes | Yes | Yes | Yes |
| Product | Dispersion medium | | Water | Water | Water | Water | Water | Water | Water |
| | Metal oxide | | Silica-Titania | Silica-Alumina | Silica | Silica | Silica | Silica | Silica |
| | Metal oxide concentration | (mass %) | 10 (SiO$_2$/TiO$_2$ = 96.8/3.2) | 10 (SiO$_2$/Al$_2$O$_3$ = 96.8/3.2) | 10 | 10 | 10 | 10 | 10 |
| | Content of Na in particle/metal oxide | (ppm) | Less than 1 | Less than 1 | Less than 1 | Less than 1 | Less than 1 | Less than 1 | Less than 1 |
| | Content of impurity*$^1$/metal oxide | (ppm) | Less than 10 | Less than 10 | Less than 10 | Less than 10 | Less than 10 | Less than 10 | Less than 10 |
| | pH | | 9 | 9 | 9 | 9 | 9 | 9 | 9 |
| | Average particle size by TEM | (nm) | 25.3 | 24.0 | 22.0 | 21.5 | 22.0 | 14.0 | 310 |
| | Standard deviation | (nm) | 6.0 | 4.3 | 4.6 | 4.1 | 4.6 | 4.9 | 65.1 |
| | CV value | | 0.24 | 0.18 | 0.21 | 0.19 | 0.21 | 0.35 (wide distribution) | 0.21 (wide distribution) |
| | Average bubble diameter | (nm) | 112 | 98 | 79 | 68 | 70 | — | — |
| | Total number of bubbles | (100 million bubbles/ml) | 1.02 | 1.23 | 1.4 | 1.4 | 1.3 | — | — |

Impurity of *$^1$ indicates each of alkali metal, alkaline earth metal, Zn, Pb, Ag, Mn, Co, Mo, Cu, Ni Cr, U and Th.

The invention claimed is:

1. A silica particle dispersion comprising silica fine particles having an average particle size of 3 to 10 nm and fine bubbles having an average bubble diameter of 40 nm to 10 μm, wherein
the silica particle dispersion includes $1.0 \times 10^3$ bubbles/mL to $1.0 \times 10^{11}$ bubbles/mL of the fine bubbles.

2. The silica particle dispersion according to claim 1, wherein
a content of Na contained in the silica fine particles is 10 ppm or less.

3. The silica particle dispersion according to claim 1, wherein
a total content of a nitrogen atom-containing compound contained in the dispersion comprising $NH_X$, wherein X is an integer of 1 to 4 is 1 ppm or less based on silica.

4. The silica particle dispersion according to claim 1, wherein a content of each of Al, Ca, Mg, Ti, K, Zn, Pb, Cr, Fe, Mn, Ag, Cu and Ni contained in the silica particle dispersion is 10 ppm or less based on silica.

5. The silica particle dispersion according to claim 1, wherein
the fine bubbles are bubbles containing at least one of nitrogen, hydrogen, oxygen, ozone, carbon dioxide gas, and a noble gas.

6. The silica particle dispersion according to claim 1, wherein
a specific surface area of the silica fine particle is 270 to 900 $m^2/g$.

7. The silica particle dispersion according to claim 1, wherein
an amount of surface charge of the silica fine particles is 260 to 900 μeq/g.

8. The silica particle dispersion according to claim 1, wherein
the silica particle dispersion includes $1.0 \times 10^5$ bubbles/mL to $1.0 \times 10^{11}$ bubbles/mL of the fine bubbles.

9. A method for producing the silica particle dispersion of claim 1, comprising hydrolyzing silane alkoxide, to produce the silica fine particles having the average particle size of 3 to 10 nm, in a liquid phase containing the fine bubbles having the average bubble diameter of 40 nm to 10 μm.

10. The method for producing the silica particle dispersion according to claim 9, comprising mixing a first solution containing the silane alkoxide with a second solution containing the fine bubbles.

11. The method for producing the silica particle dispersion according to claim 10, wherein
the second solution contains $1.0 \times 10^5$ bubbles/mL or more of the fine bubbles.

12. The method for producing the silica particle dispersion according to claim 9, wherein
the fine bubbles are bubbles containing at least one of nitrogen, hydrogen, oxygen, ozone, carbon dioxide gas, and a noble gas.

* * * * *